United States Patent
King

(10) Patent No.: US 8,308,223 B2
(45) Date of Patent: Nov. 13, 2012

(54) NET STRUCTURE FOR A VEHICLE

(75) Inventor: Darin D. King, Raymond, OH (US)

(73) Assignee: Honda Motor Company, Ltd., Tokyo (JP)

( * ) Notice: Subject to any disclaimer, the term of this patent is extended or adjusted under 35 U.S.C. 154(b) by 228 days.

(21) Appl. No.: 12/849,366

(22) Filed: Aug. 3, 2010

(65) Prior Publication Data

US 2012/0032431 A1 Feb. 9, 2012

(51) Int. Cl.
*B60R 21/13* (2006.01)
(52) U.S. Cl. .............. 296/190.03; 112/470.33; 116/203; 160/327; 180/271; 280/749
(58) Field of Classification Search ................ 49/13, 14, 49/381, 463, 465; 112/152, 470.33; 116/203, 116/208; 160/10, 95, 96, 97, 98, 108, 120, 160/121.1, 123, 133, 238, 243, 264, 265, 160/266, 268.1, 269, 290.1, 327, 350, 368.1, 160/DIG. 2, DIG. 8, DIG. 15; 180/271, 908; 280/290, 304.3, 304.4, 748, 749, 756; 296/190.01, 296/190.03, 190.08, 190.11; 7/13, 14, 381, 7/463, 465
See application file for complete search history.

(56) References Cited

U.S. PATENT DOCUMENTS

| | | |
|---|---|---|
| 1,203,587 A | 11/1916 | Cring |
| 1,260,585 A | 3/1918 | Simon |
| 1,470,454 A | 10/1923 | Landeweer et al. |
| 1,614,010 A | 1/1927 | Martinov |
| 1,657,506 A | 1/1928 | Jacobson |
| 1,684,027 A | 9/1928 | Hinman |
| 1,796,148 A | 3/1931 | Greenblatt |
| 2,565,919 A * | 8/1951 | Hill .......................... 296/190.05 |
| 2,596,144 A | 5/1952 | Anderson |
| 3,011,820 A | 12/1961 | Frieder et al. |
| 3,276,512 A | 10/1966 | Gallagher |

(Continued)

FOREIGN PATENT DOCUMENTS

GB 2033849 A 5/1980

OTHER PUBLICATIONS

Notice of Allowance and Fees Due; Dated Mailed: Dec. 13, 2011; U.S. Appl. No. 12/414,728, Applicants Bill E. Orr et al.; Filing Date: Mar. 31, 2009: Titled: Net Structures, Vehicles including Net Structures, and Methods; 14 pages.

(Continued)

*Primary Examiner* — Glenn Dayoan
*Assistant Examiner* — Paul Chenevert
(74) *Attorney, Agent, or Firm* — Ulmer & Berne LLP

(57) ABSTRACT

A net structure for attachment to a roll cage of a vehicle includes a mesh structure, a reinforcement structure attached to the mesh structure, and an overload indicator. Upon a rollover event during operation of a vehicle, to which the net structure is attached, with the net structure in a lowered, closed configuration, an operator of the vehicle may impact the net structure, causing the net structure to deflect outwardly. This outward deflection of the net structure may cause the overload indicator to become visible, which provides an indication to an operator or other person associated with the vehicle that the structural integrity of the net structure has been compromised, such that replacement of the net structure may be warranted.

27 Claims, 16 Drawing Sheets

U.S. PATENT DOCUMENTS

| | | | |
|---|---|---|---|
| 3,288,200 A | | 11/1966 | Gagne |
| 3,338,290 A | | 8/1967 | Servis |
| 3,438,674 A | * | 4/1969 | Booth et al. ............... 297/472 |
| 3,550,956 A | | 12/1970 | Lowe |
| 3,550,957 A | | 12/1970 | Radke et al. |
| 3,749,147 A | | 7/1973 | Hess et al. |
| 3,861,744 A | * | 1/1975 | Yamada et al. ............ 297/472 |
| 3,926,227 A | | 12/1975 | Takada et al. |
| 4,031,942 A | | 6/1977 | Shelton |
| 4,060,278 A | * | 11/1977 | Maeyerspeer ............ 297/472 |
| 4,368,902 A | | 1/1983 | McDowell |
| 4,457,251 A | | 7/1984 | Weman et al. |
| 4,688,846 A | * | 8/1987 | Martin, Jr. ................ 296/102 |
| 4,805,467 A | * | 2/1989 | Bartholomew ......... 73/862.541 |
| 4,941,710 A | * | 7/1990 | Baymak et al. ............ 297/471 |
| 4,958,853 A | | 9/1990 | Doty |
| 4,973,082 A | | 11/1990 | Kincheloe |
| 4,979,400 A | * | 12/1990 | Bartholomew ......... 73/862.541 |
| 4,986,389 A | | 1/1991 | Halligan, Sr. et al. |
| 5,026,231 A | | 6/1991 | Moore |
| 5,039,168 A | * | 8/1991 | Baymak et al. ............ 297/471 |
| 5,050,906 A | * | 9/1991 | Kneip ........................ 280/805 |
| 5,119,767 A | * | 6/1992 | Jimenez .................... 119/770 |
| 5,121,958 A | | 6/1992 | Goeden et al. |
| 5,123,468 A | | 6/1992 | Mater, Jr. |
| 5,259,656 A | | 11/1993 | Carroll |
| 5,290,086 A | | 3/1994 | Tucker |
| 5,375,879 A | | 12/1994 | Williams et al. |
| 5,417,273 A | | 5/1995 | Bamonte |
| 5,423,589 A | | 6/1995 | Pank |
| 5,443,110 A | | 8/1995 | Plott, Sr. |
| 5,460,409 A | | 10/1995 | Conner |
| 5,489,136 A | | 2/1996 | Pank |
| 5,509,717 A | | 4/1996 | Martin |
| 5,529,341 A | | 6/1996 | Hartigan |
| 5,531,478 A | | 7/1996 | Houston et al. |
| 5,597,028 A | | 1/1997 | Rolf et al. |
| 5,678,882 A | | 10/1997 | Hammond |
| 5,695,217 A | | 12/1997 | Ament et al. |
| 5,713,624 A | | 2/1998 | Tower |
| 5,787,955 A | | 8/1998 | Dargie |
| 5,879,048 A | | 3/1999 | Tower |
| 6,142,253 A | * | 11/2000 | Mueller et al. ............ 180/219 |
| 6,183,028 B1 | | 2/2001 | Ament et al. |
| 6,354,355 B1 | | 3/2002 | Ragouzis |
| 6,367,536 B1 | | 4/2002 | St. Louis |
| 6,443,489 B1 | | 9/2002 | Ehrenberger et al. |
| 6,491,052 B1 | | 12/2002 | Zheng |
| 6,502,859 B1 | | 1/2003 | Svetlik |
| 6,505,880 B1 | | 1/2003 | Castro |
| 6,626,462 B2 | | 9/2003 | Saczalski et al. |
| 6,648,396 B2 | | 11/2003 | Monahan et al. |
| 6,755,232 B1 | | 6/2004 | Holland et al. |
| 6,773,054 B2 | | 8/2004 | Martini |
| 6,847,290 B2 | | 1/2005 | Tardif |
| 6,869,125 B2 | | 3/2005 | Hamm |
| 6,905,098 B2 | | 6/2005 | Tisol, Jr. |
| 6,979,045 B1 | | 12/2005 | Evans |
| 7,036,869 B1 | | 5/2006 | Stipanovich |
| 7,097,204 B2 | | 8/2006 | Jessup et al. |
| 7,125,069 B2 | | 10/2006 | Cacucci et al. |
| 7,147,263 B2 | | 12/2006 | Schneidau et al. |
| 7,252,325 B2 | | 8/2007 | Richards et al. |
| 7,422,256 B2 | | 9/2008 | Mueller |
| 7,556,291 B2 | | 7/2009 | Gale et al. |
| 7,730,846 B2 | * | 6/2010 | Pett et al. ................... 116/212 |
| 7,841,378 B2 | | 11/2010 | Henning |
| 8,025,325 B1 | | 9/2011 | Carrier et al. |
| 8,123,279 B2 | * | 2/2012 | Orr et al. ................... 296/148 |
| 2001/0023745 A1 | | 9/2001 | Haid et al. |
| 2001/0033084 A1 | | 10/2001 | Murray et al. |
| 2002/0056980 A1 | | 5/2002 | Saczalski et al. |
| 2002/0180197 A1 | | 12/2002 | Saczalski et al. |
| 2004/0232719 A1 | | 11/2004 | Scarlett |
| 2007/0145775 A1 | | 6/2007 | Smith |
| 2008/0000595 A1 | | 1/2008 | Cohen |
| 2008/0251002 A1 | | 10/2008 | Burleigh |
| 2009/0243339 A1 | | 10/2009 | Orr et al. |
| 2009/0267335 A1 | | 10/2009 | Johnson et al. |
| 2012/0048646 A1 | * | 3/2012 | Harris, Jr. .................. 182/6 |

OTHER PUBLICATIONS

Paul A. Chenevert, Office Action having Notification Date of Apr. 4, 2011, U.S. Appl. No. 12/414,728, Titled: Net Structures, Vehicles including Net Structures, and Methods, Filed: Mar. 31, 2009, Inventors: Bill E. Orr et al., 19 pages.

U.S. Appl. No. 12/750,757, Titled: Net Structure for a Vehicle, Filed Mar. 31, 2010, Inventors: Darin D. King, et al., in its entirety.

Paul A. Chenevert, Office Action having Notification Date of Sep. 28, 2011, U.S. Appl. No. 12/414,728, Titled: Net Structures, Vehicles Including Net Structures, and Methods, Filed: Mar. 31, 2009, Inventors: Bill E. Orr et al., 17 pages.

Office Action; Notification Date: Feb. 27, 2012; U.S. Appl. No. 12/750,757; Applicants: Darin D. King et al.; Filing Date: Mar. 31, 2010; Titled: Net Structure for Vehicle ; 45 pages.

Webpage printout depicting Rhino Foot Nets/Mesh [online]. [Retrieved on Mar. 20, 2008]. Retrieved from the Internet: <URL:www.simpsonraceproducts.com/products/offroad_nets_rhino.aspx>. 2 pages.

Webpage printout depicting mounting instructions for a Simpson-Foot Net [online]. [Retrieved on Mar. 20, 2008]. Retrieved from the Internet: <URL:www.simpsonsraceproducts.com/prod_images/offroad/foot_net_diagram.jpg>. 1 page.

Webpage printout depicting Racing Window Safety Net Installation [online]. [Retrieved on Mar. 4, 2008]. Retrieved from the Internet: <URL: www.circletrack.com/safety/ctrp_0803_racing_window_net/photo_14.html>. 1 page.

Honda Utility Vehicle Having Net Structure and Net Stays, represented by nine (9) sheets of color photographs labelled Exhibit A and attached hereto, which was disclosed to the public during Aug. 2008.

"2009 Honda Big Red Owner's Manual"; Honda Motor Co., Ltd.; In the public domain prior to Mar. 31, 2009; cover page, pp. 24-27, and last page; 4 sheets.

U.S. Appl. No. 12/414,728, titled: Net Structures, Vechicles Including Net Structures, and Methods, Filed: Mar. 31, 2009, Inventors: Orr et al., in its entirety.

Paul A. Chenevert, Office Action having Notification Date of Feb. 27, 2012, U.S. Appl. No. 12/750,757, Titled: Net Structure for a Vehicle, Filed: Mar. 31, 2010, Inventors: Darin D. King et al., 51 pages.

Paul A. Chenevert, Office Action having Notification Date of Jul. 2, 2012, U.S. Appl. No. 12/750,757, Titled: Net Structure For a Vehicle, Filed: Mar. 31, 2010, Inventors: Darin D. King et al., 31 pages.

* cited by examiner

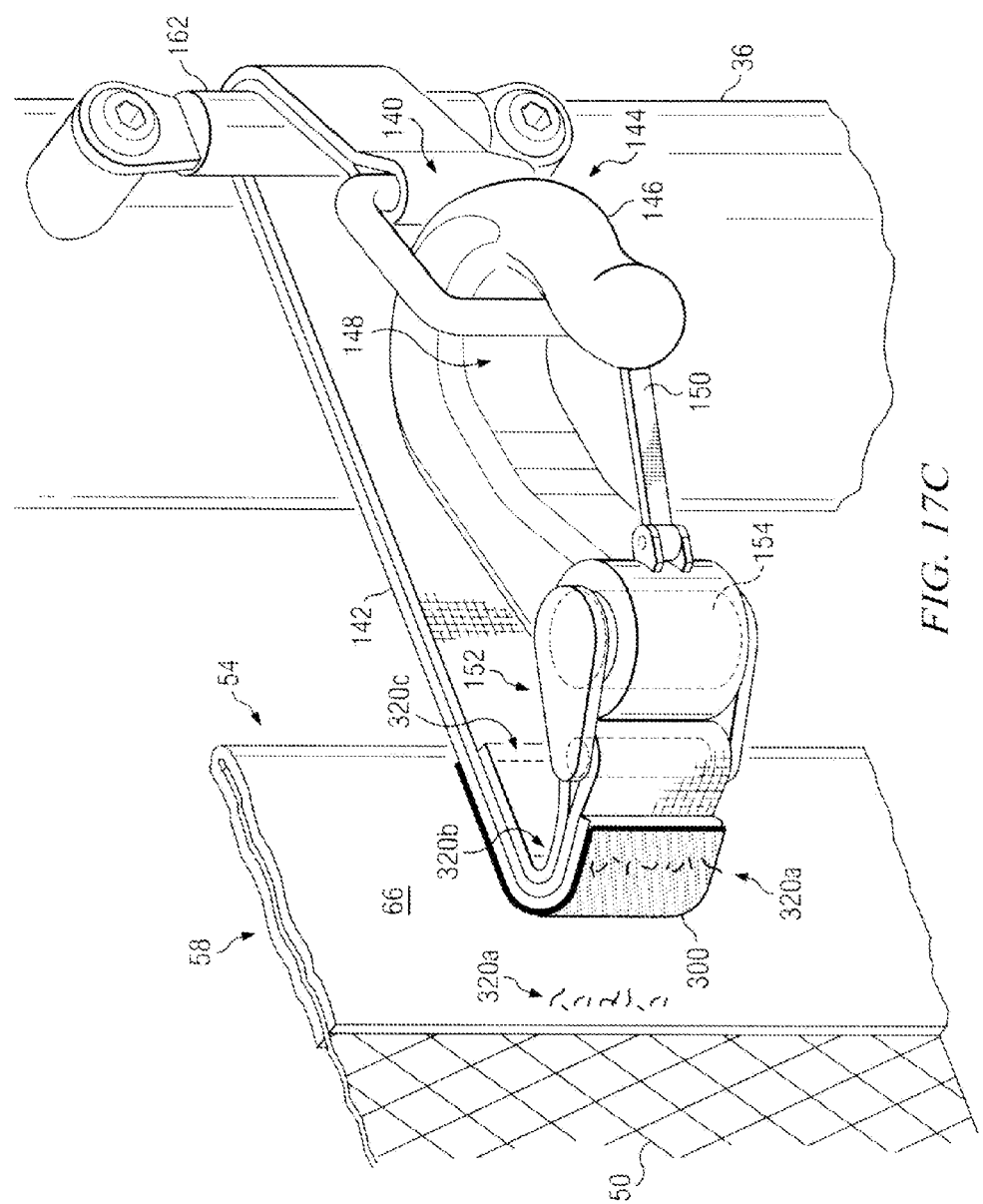

NET STRUCTURE FOR A VEHICLE

CROSS REFERENCES

This application is related to co-pending U.S. patent application titled "Net Structure For A Vehicle", filed on Mar. 31, 2010, and having Ser. No. 12/750,757, which is hereby expressly incorporated by reference herein in its entirety.

TECHNICAL FIELD

A net structure is configured for attachment to a roll cage of a vehicle and can include an overload indicator.

BACKGROUND

Some conventional utility vehicles include a roll cage which assists in protecting properly seated and secured operators during a rollover situation or a situation involving a significant lateral incline of the vehicle.

SUMMARY

A net structure for attachment to a roll cage of a vehicle includes a mesh structure and a reinforcement structure attached to the mesh structure. Each of the mesh structure and the reinforcement structure is flexible. The net structure further includes means for attaching the net structure to a roll cage of a vehicle. The means for attaching the net structure is attached to the reinforcement structure and is configured for attachment to a roll cage of a vehicle. The net structure further includes an overload indicator. The overload indicator is at least substantially entirely obscured from view by at least one of the reinforcement structure and the means for attaching the net structure, until such time that a tensile force, which is equal to or greater than a predetermined tensile force, is applied to the means for attaching net structure wherein at least a portion of the overload indicator is visible and indicates that the structural integrity of the net structure has been compromised.

According to another embodiment, a net structure for attachment to a roll cage of a vehicle includes a mesh structure and a reinforcement structure attached to the mesh structure. Each of the mesh structure and the reinforcement structure is flexible. The net structure further includes a clip assembly that includes a flexible member and a clip associated with the flexible member. The flexible member is attached to the reinforcement structure. The clip assembly is configured for releasable attachment to a roll cage of a vehicle. The net structure further includes an overload indicator associated with the flexible member of the clip assembly. The overload indicator is at least substantially entirely obscured from view by at least one of the reinforcement structure and the flexible member of the clip assembly, until such time that a tensile force, which is equal to or greater than a predetermined tensile force, is applied to the flexible member wherein at least a portion of the overload indicator is visible and indicates that the structural integrity of the net structure has been compromised.

According to another embodiment, a vehicle includes a roll cage and a net structure attached to the roll cage. The net structure includes a mesh structure and a reinforcement structure attached to the mesh structure. Each of the mesh structure and the reinforcement structure is flexible. The net structure further includes means for attaching the net structure to the roll cage. The means for attaching the net structure is attached to the reinforcement structure. The net structure further includes an overload indicator. The overload indicator is at least substantially entirely obscured from view by at least one of the reinforcement structure and the means for attaching the net structure, until such time that a tensile force, which is equal to or greater than a predetermined tensile force, is applied to the means for attaching the net structure wherein at least a portion of the overload indicator is visible and indicates that the structural integrity of the net structure has been compromised.

According to another embodiment, a vehicle includes a roll cage and a net structure attached to the roll cage. The net structure includes a mesh structure, a reinforcement structure attached to the mesh structure and an overload indicator. Each of the mesh structure and the reinforcement structure is flexible. The net structure further includes a clip assembly. The clip assembly includes a flexible member and a clip. The clip is pivotally connected to the flexible member, and the flexible member is attached to the reinforcement structure. The clip assembly is selectively, releasably attached to the roll cage. The overload indicator is at least substantially entirely obscured from view by at least one of the reinforcement structure and the flexible member of the clip assembly, until such time that a tensile force, which is equal to or greater than a predetermined tensile force, is applied to the flexible member of the clip assembly wherein at least a portion of the overload indicator is visible and indicates that the structural integrity of the net structure has been compromised.

BRIEF DESCRIPTION OF THE DRAWINGS

Various embodiments will be better understood with regard to the following description, appended claims and accompanying drawings, wherein:

FIG. 17C is a perspective view further depicting the overload indicator shown in FIGS. 17A and 17B, with the overload indicator being partially separated from the reinforcement structure of the net structure;

DETAILED DESCRIPTION

Figure 1:
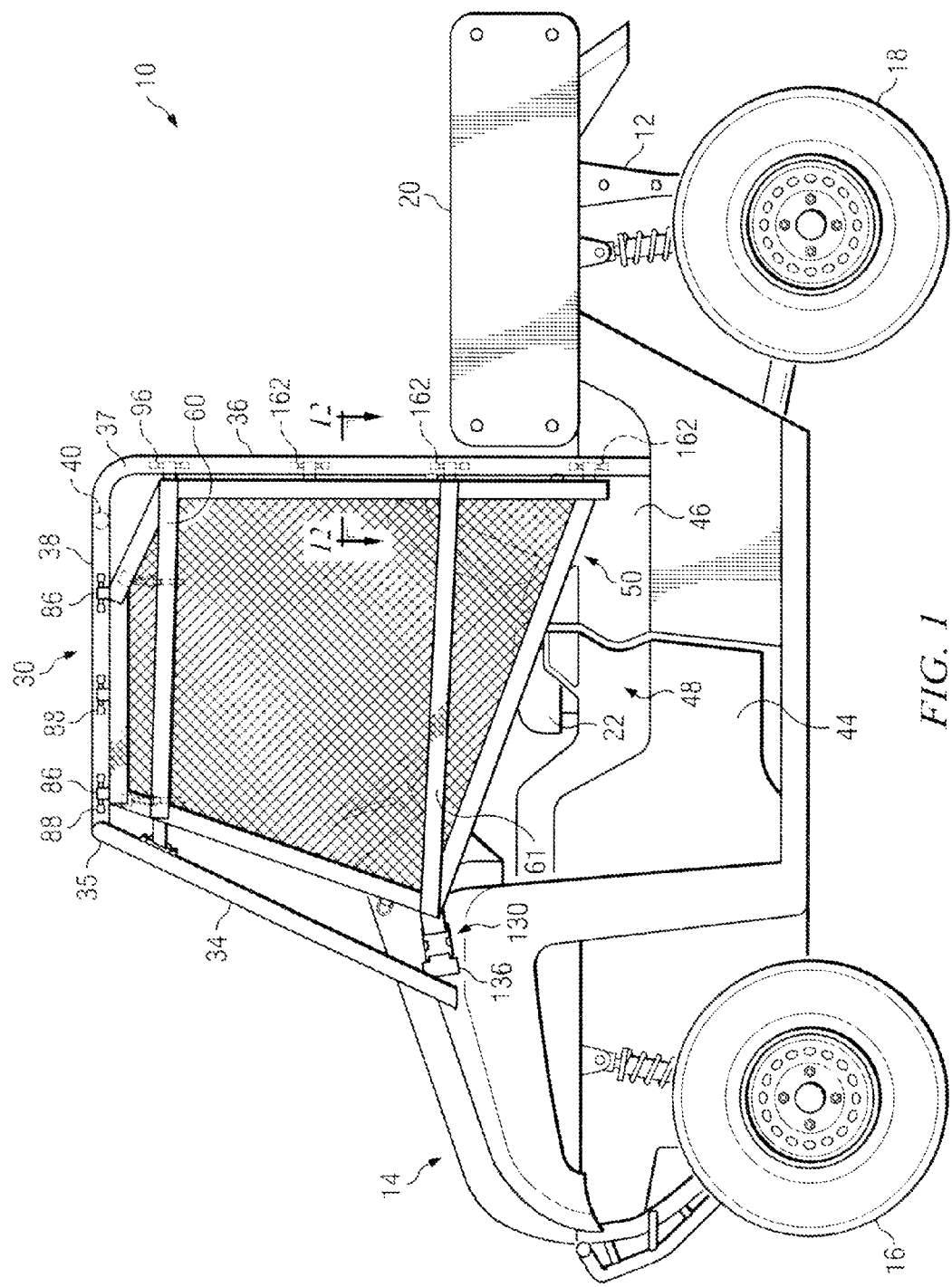
FIG. 1 is a left side elevational view of a vehicle that includes a net structure according to one embodiment, wherein the net structure is attached to a roll cage of the vehicle and is depicted in a lowered, closed configuration.

Referring to the drawings, wherein like reference numbers indicate the same or corresponding elements throughout the views, FIG. 1 illustrates a vehicle 10 that can include a frame, indicated generally at 12, and a body 14 supported by frame 12. Vehicle 10 can further include a pair of front wheels 16 and a pair of rear wheels 18. The wheels 16 and 18 can be suspended from frame 12 and can be rotatable relative to frame 12. Vehicle 10 can also include a source of motive power (not shown), which can be an internal combustion engine and/or one or more electric motors, and a drivetrain (not shown) for transferring torque from the source of motive power to the rear wheels 18 and/or the front wheels 16.

Vehicle 10 is shown to be a utility-type vehicle that can include a utility bed 20 that can be fixed with respect to the body 14, or that can be selectively pivotable as a dump-type bed. The utility bed 20 can be configured to support cargo and/or passengers for transportation by the vehicle 10. Vehicle 10 can further include a seat 22 that can be supported by the frame 12 and/or body 14, and that can be configured to support an operator (not shown). Seat 22 can be a bucket-type seat or a bench-type seat. Vehicle 10 can also include a steering wheel 26 that can be coupled to the front wheels 16. By turning the steering wheel 26, it will be appreciated that an operator can effect steering of the vehicle 10.

Vehicle 10 can include a roll cage 30 which can be attached to, and supported by, the frame 12 and/or body 14 of vehicle 10. The roll cage 30 can at least partially define a protected area, indicated generally at 32 in FIGS. 2, 3A and 3B. Seat 22 can be positioned within the protected area 32, such that an operator of vehicle 10 can be located within the protected area 32 when seated upon seat 22 during operation of vehicle 10. In one embodiment, as shown in FIGS. 1-4, it will be appreciated that the utility bed 20 might not be provided within the protected area 32. As such, it will be appreciated that cargo and/or persons supported by the utility bed might not be provided within the protected area 32. However, in other embodiments, a utility bed and/or cargo and/or persons supported by a utility bed might reside within a protected area at least partially defined by a roll cage of a vehicle. In still other embodiments, a vehicle incorporating a roll cage might not include a utility bed.

Referring to FIGS. 1, 2, 3A and 3B, the roll cage 30 can include a forward tubular member 34, a rearward tubular member 36, and an upper tubular member 38. Each of the tubular members 34 and 36 can be attached to the frame 12 and/or the body 14 of vehicle 10. An upper end 35 of the forward tubular member 34, and an upper end 37 of the rearward tubular member 36, can each be integral with the upper tubular member 38. The forward tubular member 34, the rearward tubular member 36 and the upper tubular member 38 can be positioned on a left side of the vehicle 10 as shown in FIGS. 1, 2, 3A and 3B.

Figure 4:
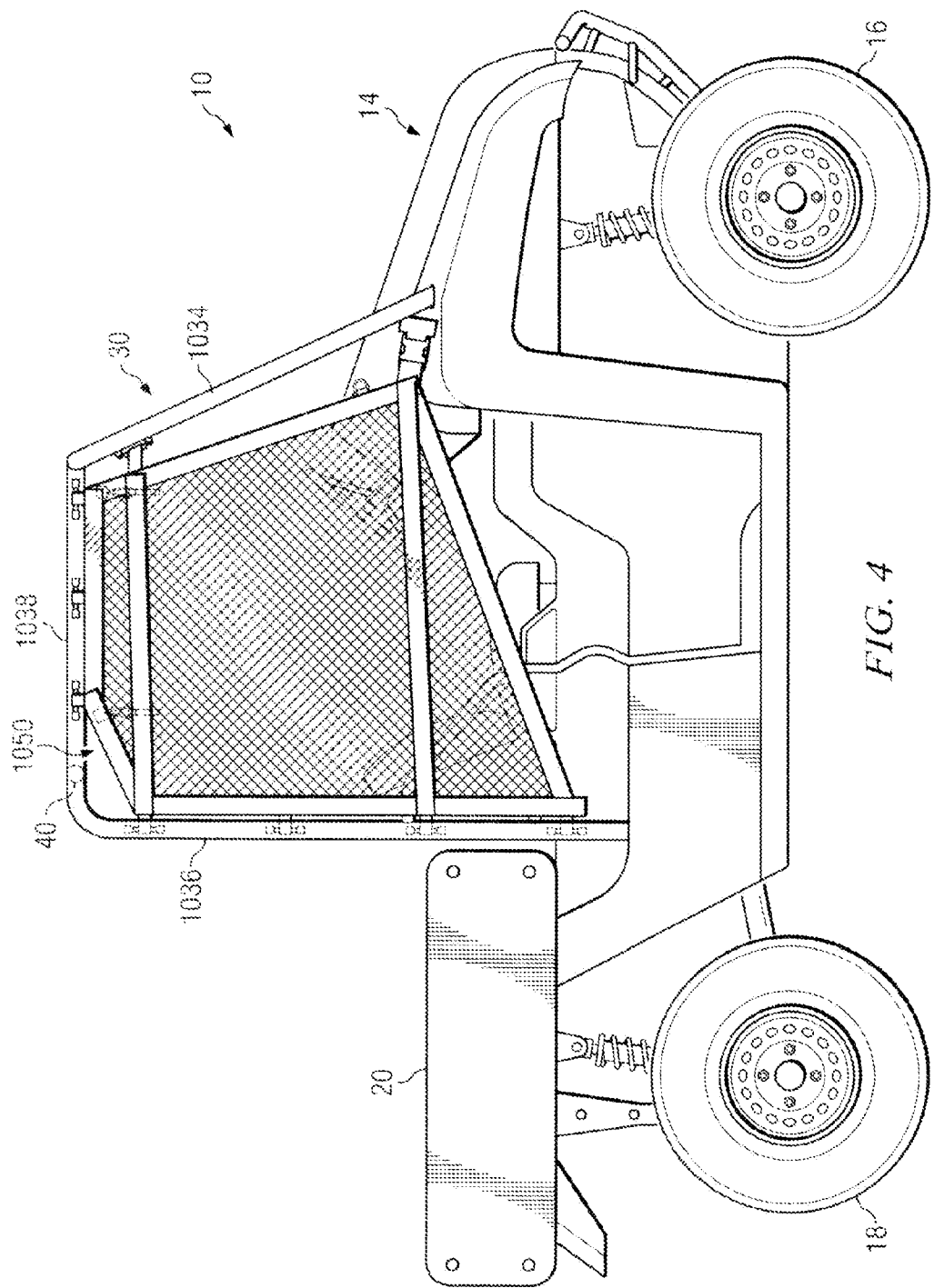
FIG. 4 is a right side elevational view of the vehicle shown in FIG. 1 and depicting a net structure according to another embodiment that is positioned on a right side of the vehicle.
Figure 12:
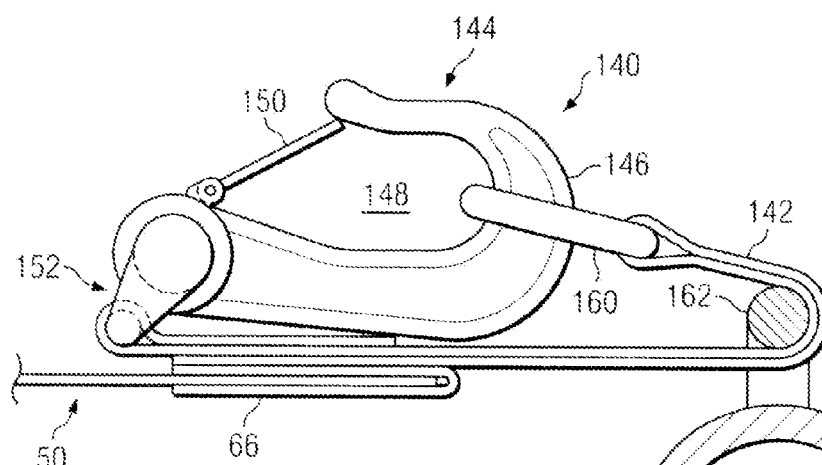
FIG. 12 is a cross-sectional view taken along line 12-12 in FIG. 1.
Figure 12:
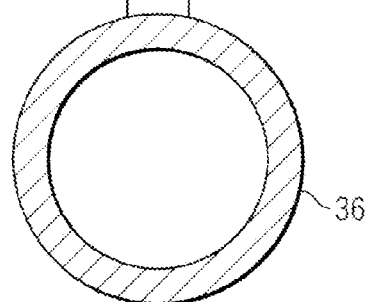

The roll cage 30 can further include a similar arrangement of tubular members on a right side of the vehicle 10, as shown in FIG. 4, e.g., a forward tubular member 1034, a rearward tubular member 1036 and an upper tubular member 1038. The roll cage 30 can also include one or more cross-members, for example, cross-members 40 and 41 (FIG. 10) that can connect the upper tubular members 38 and 1038. The tubular members of roll cage 30 can have a variety of configurations. In one embodiment, the tubular members can be generally cylindrical and can have a hollow interior, as shown in FIG. 12 with respect to the rearward tubular member 36. In other embodiments, roll cages can be provided that include generally cylindrical, solid tubular members. In still other embodiments, roll cages can be provided with tubular members having a variety of alternative shapes, e.g., tubular members having generally square or generally rectangular cross-sectional shapes.

Roll cage 30 can at least partially define one or more access openings. For example, roll cage 30 can at least partially define an access opening 42 (FIGS. 2, 3A and 3B) that communicates with the protected area 32 and is on the left side of vehicle 10. The roll cage 30 can at least partially define a similar access opening on the right side of the vehicle 10 that communicates with the protected area 32. The forward tubular member 34, the rearward tubular member 36 and the upper tubular member 38 of roll cage 30 can cooperate to at least partially define the access opening 42. An operator of vehicle 10 can pass through the access opening 42 into the protected area 32 when boarding the vehicle 10, and can pass from the protected area 32 through the access opening 42 when exiting the vehicle 10.

Any of a variety of other features of a vehicle can cooperate with roll cage 30 to define an access opening to a protected area, such as the access opening 42 that communicates with the protected area 32. For example, in the embodiment illustrated in FIGS. 1, 2, 3A and 3B, the roll cage 30 is shown to cooperate with a door 44 and a stationary portion 46 of body 14 to define the access opening 42. In one embodiment, a forward end of the door 44 can be hingedly attached to body 14 and/or frame 12 such that the door 44 can swing between open and closed positions. A door latch assembly can be provided (e.g., in the vicinity indicated generally at 48) for selective use by an operator to selectively lock a rearward or swinging end of the door 44 to the stationary portion 46 of body 14, thereby locking the door 44 in a closed position as shown in FIGS. 1, 2, 3A and 3B. It will be appreciated that an access opening can additionally, or alternatively, be at least partially defined by one or more other features of a vehicle.

The protected area 32 can be sized and configured to substantially or entirely surround one or more occupants (e.g., an operator or driver, and a passenger, each not shown) of the vehicle 10 during operation of the vehicle 10. As long as the occupants of vehicle 10, e.g., an operator, remain within the protected area 32 during operation of vehicle 10, the roll cage 30 can at least reduce the likelihood that the operator or other occupants of vehicle 10 will sustain injuries from direct contact with road or ground terrain, in the event vehicle 10 rolls over during operation. A seatbelt harness (not shown) can be associated with the seat 22, and one or more restraint members, e.g., a hip bolster 49 (FIG. 2), can be provided for selectively restraining an operator's torso within the vehicle 10, in the event a rollover occurs.

Vehicle 10 can further include a net structure 50 attached to the roll cage 30 and positioned on the left side of vehicle 10. The net structure 50 can selectively block at least a portion of the access opening 42. The vehicle 10 can also include a net structure 1050 attached to the roll cage 30 and positioned on the right side of vehicle 10 as shown in FIG. 4. The net structure 1050 is not shown in FIGS. 1, 2, 3A and 3B for clarity of illustration. The net structure 1050 can include features that can correspond with those of the net structure 50, and therefore net structure 1050 will not be described in detail herein. In an alternative embodiment, however, it will be appreciated that a vehicle can be provided that might have a right-side net structure that is substantially different than a left-side net structure, and/or might include only a left-side net structure or a right-side net structure. It will also be appreciated that a net structure can be provided in any of a variety of other locations and/or configurations for selectively blocking at least a portion of an access opening that communicates with a protected area on a vehicle.

Figures 5A, 5B:
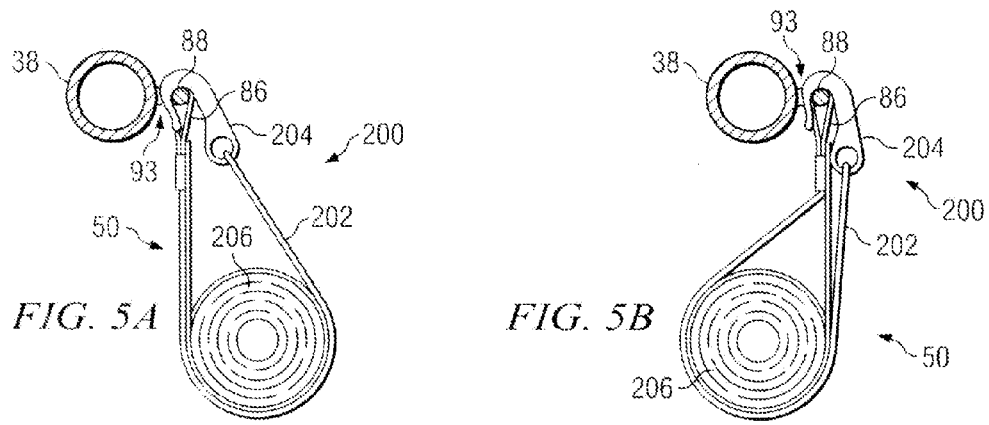
FIG. 5A is a cross-sectional view taken along line 5-5 in FIG. 2, depicting the net structure in the generally rolled-up, open configuration, with the net structure rolled-up along an outside of the net structure.
FIG. 5B is a cross-sectional view similar to FIG. 5A, but with the net structure rolled-up along an inside of the net structure.
Figure 6:
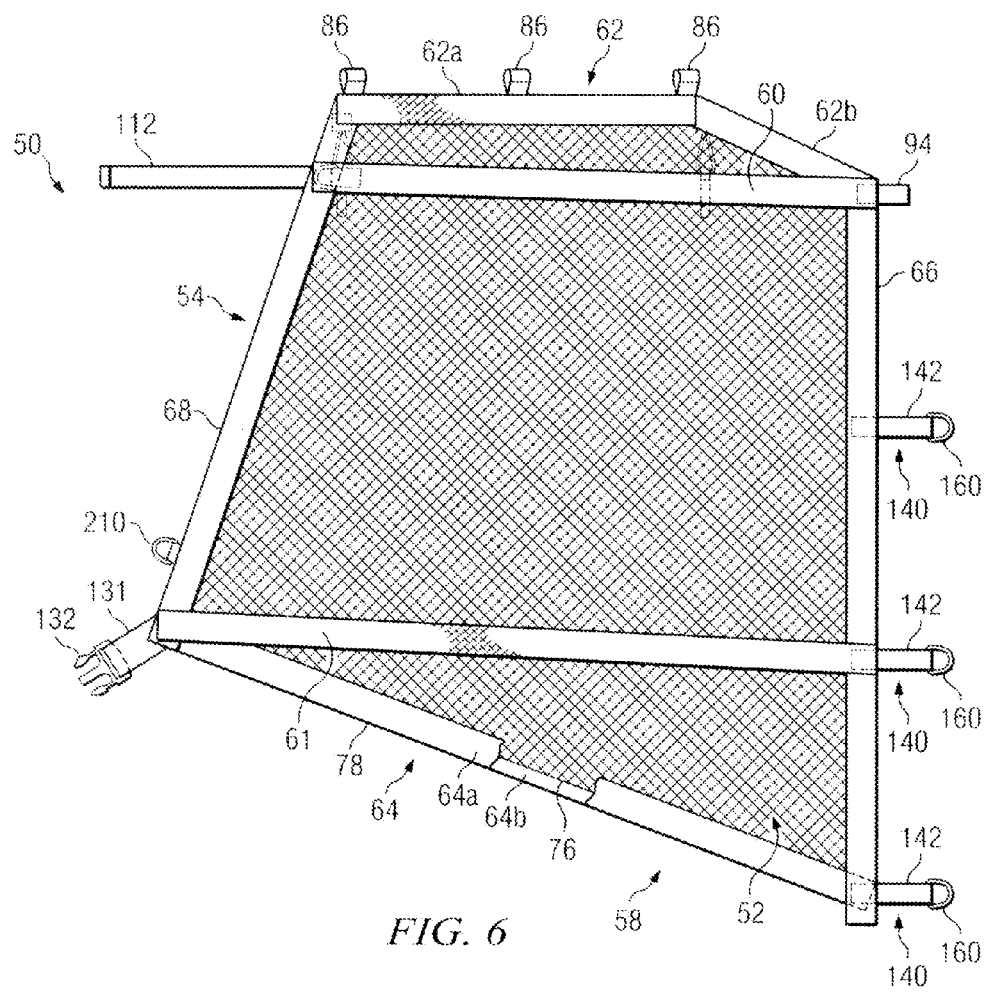
FIG. 6 is an enlarged left side elevational view of the net structure shown in FIGS. 1, 2, 3A and 3B, with the net structure removed from the vehicle.
Figure 7:
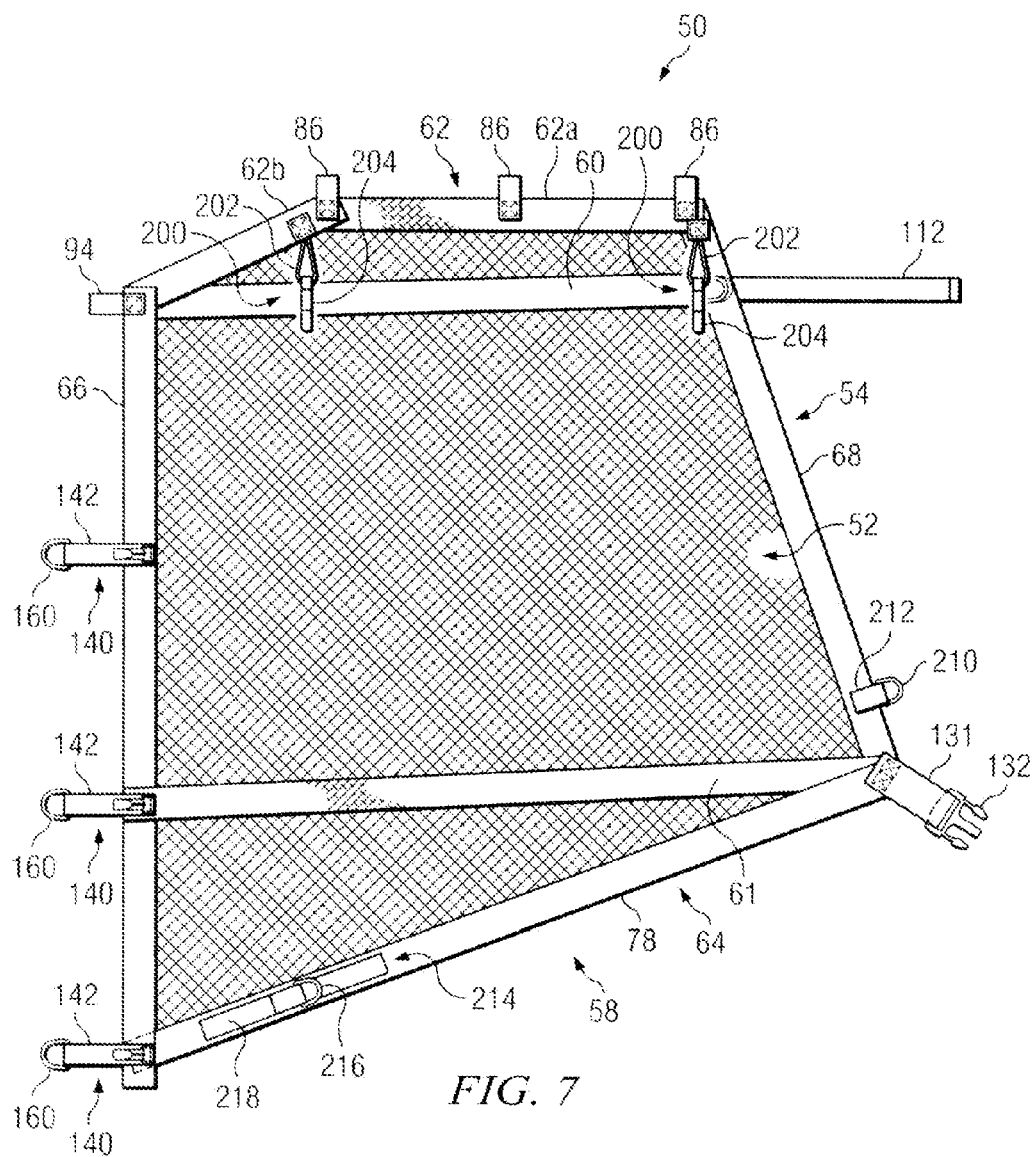
FIG. 7 is an enlarged right side elevational view of the net structure shown in FIG. 6.

Referring to FIGS. 6 and 7, the net structure 50 can include a mesh structure 52 and a reinforcement structure 54 that can be attached to the mesh structure 52. The mesh structure 52 and the reinforcement structure 54 can each be flexible such that the net structure 50 can be easily folded, bent or rolled-up for example. The net structure 50 can be selectively configurable in any one of a lowered, closed configuration, e.g., a lowered, closed configuration shown in FIG. 1, a generally rolled-up, open configuration, e.g., a generally rolled-up, open configuration shown in FIGS. 2 and 5A or an alternative generally rolled-up, open configuration shown in FIG. 5B, and a generally diagonally-folded, partially open configuration, e.g., a generally diagonally-folded, partially open configuration shown in FIG. 3A or an alternative generally diagonally-folded, partially open configuration shown in FIG. 3B, when the net structure 50 is attached to the roll cage 30. When the net structure 50 is in the lowered, closed configuration, net structure 50 can at least inhibit passage of an operator through the access opening 42. For example, when the net structure 50 is in the lowered, closed configuration and the door 44 is in a closed position, as shown in FIG. 1, the net structure 50 can cooperate with the door 44 to substantially block the access opening 42, and thus prevent the arms and/or legs of an operator from leaving the protected area 32 during operation of the vehicle 10. For example, when both the net structure 50 and door 44 are in closed positions as shown in FIG. 1, the net structure 50 can prevent an operator's arms from leaving the protected area 32 through access opening 42 during operation of the vehicle 10, and the door 44 can prevent an operator's legs from leaving the protected area 32 through access opening 42 during operation of vehicle 10. It will be appreciated that, in other embodiments, a net structure might be used in any of a variety of other arrangements, with or without one or more associated doors, for substantially blocking an access opening to a protected area of a vehicle.

The mesh structure 52 can be formed from rope netting, web netting, fabric netting, screen, and/or any of a variety of other materials. In one embodiment, the mesh structure 52 can define a uniform arrangement of similarly-sized openings as shown in FIGS. 1, 2, 3A, 3B, 6 and 7. In one embodiment, these openings might each be small enough to prevent passage of an operator's hand through the opening. In another embodiment, these openings might each be small enough to prevent passage of an operator's finger through the opening. It will be appreciated that the mesh structure 52, when so configured, can nevertheless permit visibility by an operator through the mesh structure 52.

Although the reinforcement structure 54 can be flexible, the reinforcement structure 54 can be substantially resistant to stretching. For example, the reinforcement structure 54 can be formed from webbing, fabric, belting, wire, cable, and/or some other material, for example. In one embodiment, such as that shown in FIGS. 1, 2, 3A, 3B, 6 and 7, the reinforcement structure 54 might not facilitate visibility of an operator through the reinforcement structure 54 itself (e.g., such as when formed from nylon webbing), although in another embodiment, a reinforcement structure might be transparent (e.g., such as if formed from translucent PET material). The reinforcement structure 54 can be attached to the mesh structure 52 in any of a variety of suitable configurations to help ensure maintenance of the net structure 50 in a particular shape and/or configuration. In one such configuration, the reinforcement structure 54 can include a perimeter strip 58 and one or more connecting strips, such as connecting strips 60, 61 shown in FIGS. 1, 3A, 3B, 6 and 7.

The perimeter strip 58 of the reinforcement structure 54 of net structure 50 can include a first portion 62 and can include a second portion 64 opposite the first portion 62. The perimeter strip 58 can also include a third portion 66 and a fourth portion 68 opposite the third portion 66. When the net structure 50 is attached to the roll cage 30, the first and second portions 62, 64 of the perimeter strip 58 can be upper and lower portions, respectively, of the perimeter strip 58. When the net structure 50 is attached to roll cage 30, the third and fourth portions 66, 68 of the perimeter strip 58 can be rearward and forward portions, respectively, of the perimeter strip 58. Each of the portions 62, 64, 66 and 68 of the perimeter strip 58 can be a continuous respective strip. Alternatively, one or more portions of the perimeter strip 58 can be subdivided, or can include multiple strips that are attached together. For example, the first portion 62 of perimeter strip 58 is shown to include two strips identified as 62a and 62b in FIGS. 6 and 7.

Each portion of the perimeter strip 58 can include two pieces of superimposed material, which can be inside and outside pieces of material that sandwich the mesh structure 52 between them. For example, as shown in FIG. 6, the second portion 64 of the perimeter strip 58 can include two pieces of superimposed webbing 64a, 64b (e.g., formed from nylon), which can be disposed upon opposite sides of a perimeter 76 of the mesh structure 52 to sandwich the perimeter 76 of the mesh structure 52. The two pieces of superimposed webbing 64a, 64b can be attached to one another (e.g., via adhesive and/or sewing), such that the second portion 64 of the perimeter strip 58 is attached to the mesh structure 52. The remainder of the perimeter strip 58 can be attached to the mesh structure 52 in the same or similar manner, such that the perimeter strip 58 defines an outer perimeter 78 of the net structure 50. However, it will be appreciated that a perimeter strip can be provided and/or attached to a mesh structure in any of a variety of suitable alternative configurations. For example, each portion of the perimeter strip 58 can be a single piece of material folded in half to sandwich the mesh structure 52, and sewn together.

In one embodiment, the perimeter strip 58 can be attached to the mesh structure 52 about the entire perimeter 78 of the mesh structure 52, as shown in FIGS. 6 and 7. However, in other embodiments, only a portion of a perimeter of a mesh structure might be attached to a perimeter strip or other portion of a reinforcement structure.

The connecting strips 60, 61, can be attached to the perimeter strip 58, and/or can be attached to the mesh structure 52 as described above, whereby two pieces of webbing (e.g., formed from nylon) can be disposed upon opposite sides of the mesh structure 52 and can be attached to one another (e.g., via adhesive and/or sewing) to sandwich a portion of the mesh structure 52. However, it will be appreciated that connecting strips can be provided and/or attached to a reinforcement structure and/or a mesh structure of a net structure in any of a variety of suitable configurations. Opposite ends of the connecting strips 60, 61 can be attached to the perimeter strip 58 of the reinforcement structure 54. In the embodiment shown in FIGS. 1, 2, 3A, 3B, 6 and 7, one end of the connecting strip 60 can be attached to the fourth portion 68 of the perimeter strip 58, and the opposite end of the connecting strip 60 can be attached to the perimeter strip 58 at the interface of the first portion 62 and the third portion 66 of the perimeter strip 58. One end of the connecting strip 61 can be attached to the reinforcement structure 54 at the interface of the second portion 64 and the fourth portion 68 of the perimeter strip 58, and the opposite end of the connecting strip 61 can be attached to the third portion 66 of the perimeter strip 58. However, it will be appreciated that connecting strips can be provided and/or attached to a reinforcement structure of a mesh structure in any of a variety of suitable alternative configurations and can be attached to a reinforcement structure and/or a mesh structure at a variety of suitable locations. The perimeter strip 58 of the reinforcement structure 54 can cooperate with the mesh structure 52 and/or any connecting strips (e.g., connecting strips 60, 61) to ensure that the shape and size of the net structure 50, as well as the position of the net structure 50 with respect to the roll cage 30, remain substantially constant when the net structure 50 is in the lowered, closed configuration.

The connecting strips 60, 61 can be positioned such that they do not interfere with an operator's line of sight of terrain during the operation of vehicle 10. For example, the connecting strip 60 can be positioned above, and the connecting strip 61 can be positioned below, an operator's line of sight of terrain during operation of vehicle 10. Additionally, the connecting strips 60, 61 can be positioned to effectively resist stretching or flexing of the net structure 50 due to contact by the operator, e.g., the operator's left arm, when the net structure 50 is in the lowered, closed configuration shown in FIG. 1. In other embodiments, it will be appreciated that a net structure might include one or more alternatively configured connecting strips, one or more additional connecting strips, or no connecting strips whatsoever.

In one embodiment, the net structure 50 can be attached to the roll cage 30 as described in further detail below. The net structure 50 can be attached to the roll cage 30 such that the net structure 50 can be readily removable such as to facilitate cleaning, replacement, and/or repair of the net structure 50. Additionally, the net structure can be attached to the roll cage 30 to facilitate selectively configuring the net structure 50 in the lowered, closed configuration shown in FIG. 1, the generally rolled-up, open configuration shown in FIGS. 2 and 5A or the alternative generally rolled-up, open configuration shown in FIG. 5B, and either one of the generally diagonally-folded, partially open configurations shown in FIGS. 3A and 3B. The net structure 50 is shown in FIG. 1 to extend vertically from the upper tubular member 38 of the roll cage 30 to a position generally adjacent to a lowermost portion of the seat 22 when the net structure 50 is in the lowered, closed configuration. However, it will be appreciated that a net structure might be attached to a roll cage and/or other components of a vehicle in any of a variety of other configurations and/or arrangements.

In one embodiment, the net structure 50 can be attached to the upper tubular member 38 of the roll cage 30, and to each of the forward tubular member 34 and the rearward tubular member 36 of the roll cage 30 at locations proximate the upper tubular member 38, using one or more straps and/or one or more strap assemblies, wherein the straps and/or strap assemblies can be used in conjunction with stays, or brackets, attached to the roll cage 30, as subsequently described in greater detail. Further, in one such configuration, the net structure 50 can be releasably attached to lower portions of each of the forward tubular member 34 and the rearward tubular member 36 of the roll cage 30 using one or more clip assemblies and a latch assembly. For example, as discussed subsequently in greater detail, a latch assembly can be used to releasably attach net structure 50 to a lower portion of the forward tubular member 34 of the roll cage 30, and a plurality of clip assemblies can be used to releasably attach the net structure 50 to a lower portion of the rearward tubular member 36 of the roll cage 30, which facilitates configuring the net structure 50 in the generally rolled-up, open configuration shown in FIGS. 2 and 5A, or the alternative generally rolled-up, open configuration shown in FIG. 5B.

With reference to FIGS. 6 and 7, the net structure 50 can include a plurality of straps 86. Each of the straps 86 can be configured as a loop and can be attached to the first portion 62 of the perimeter strip 58 of the reinforcement structure 54 (e.g., via adhesive and/or sewing). One or more upper stays (e.g., 88) can be used in conjunction with the straps 86 to attach the net structure 50 to the upper tubular member 38 of roll cage 30. For example, with reference to FIGS. 1, 2, 3A, 3B and 6, like quantities of straps 86 and upper stays 88 can be provided, with each of the upper stays 88 inserted through an opening defined by the looped configuration of a respective one of the straps 86 and then attached to the upper tubular member 38 of the roll cage 30. Three straps 86 and three upper stays 88 are shown in FIGS. 1, 2, 3A and 3B. However, it will be appreciated that different quantities of straps 86 and upper stays 88 can be used, and that the quantity of straps 86 can be different than the quantity of upper stays 88. In one embodiment, a single upper stay can be used in conjunction with a plurality of the straps 86, with the single upper stay passing through the openings defined by each of the straps 86, and attached to the upper tubular member 38.

Figure 8:
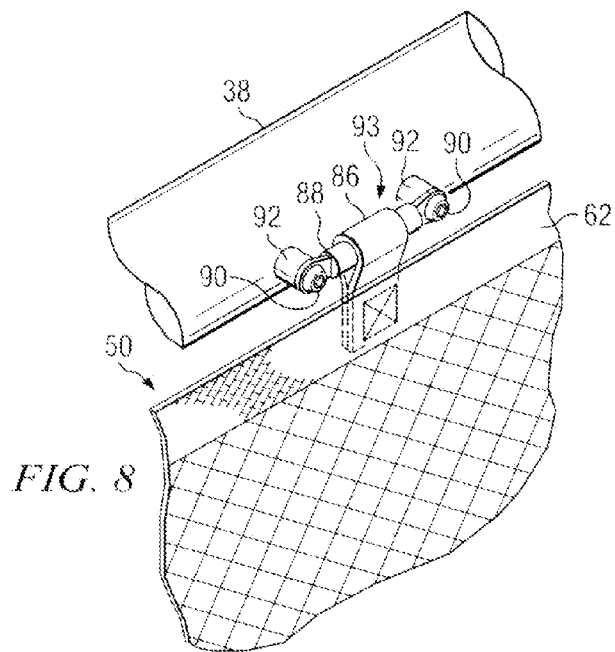
FIG. 8 is an enlarged, fragmentary perspective view depicting a portion of the net structure, and a portion of an upper tubular member of the roll cage, depicted in FIGS. 1, 2, 3A and 3B.

As shown in FIG. 8 with respect to one of the upper stays 88, each of the upper stays 88 can be attached indirectly to the upper tubular member 38 using a pair of conventional fasteners, such as bolts 90. Each of the bolts 90 can be threaded into a respective embossment 92 attached to the upper tubular member 38 (e.g., by welding), to attach the respective upper stay 88 to the upper tubular member 38. The upper stays 88, embossments 92, and upper tubular member 38 can cooperate to define an aperture 93 that can be sized and configured to receive a strap, e.g., one of the straps 86, and/or to receive an attachment member of a retainer assembly, as subsequently described. It will be appreciated that stays, or brackets, can be provided having different configurations and/or that can be attached directly to the upper tubular member 38, and that can cooperate with at least the upper tubular member 38 to define an aperture suitable for receiving a strap, e.g., one of the straps 86, and/or an attachment member of a retainer assembly.

Figure 9:
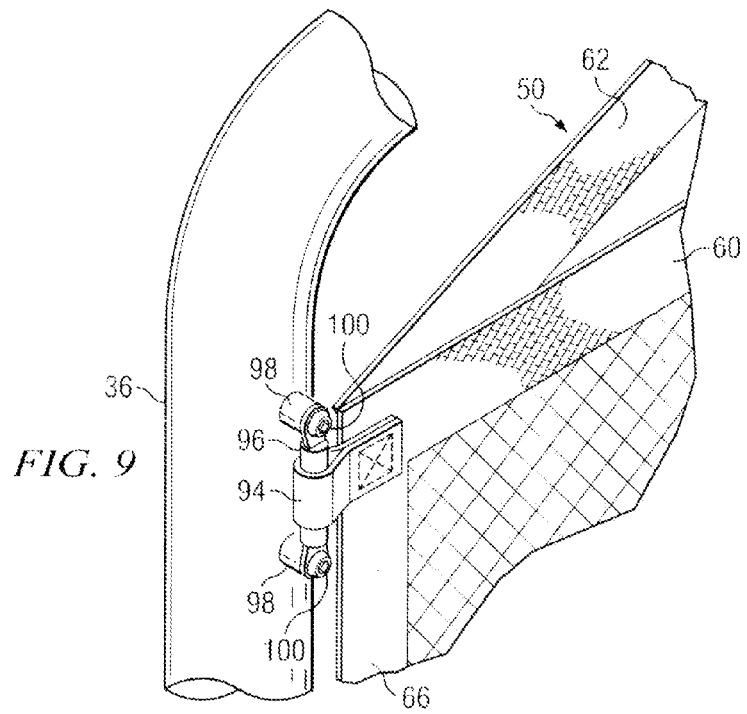
FIG. 9 is an enlarged, fragmentary perspective view depicting an inside, upper, rearward portion of the net structure shown in FIGS. 1, 2, 3A and 3B, and a portion of a rearward tubular member of the roll cage of the vehicle shown in FIGS. 1, 2, 3A and 3B.

With reference to FIG. 9, the net structure 50 can further include a strap 94 that can be attached to the reinforcement structure 54 of the net structure 50, e.g., the third portion 66 of the perimeter strip 58 of the reinforcement structure 54. The strap 94 can be attached to the rearward tubular member 36 of roll cage 30 using a rearward, upper stay 96 that can be attached to the rearward tubular member 36 at a location proximate the upper tubular member 38 such that an upper portion of the net structure 50 is attached to the rearward tubular member 36. Strap 94 can be configured as a loop and the rearward, upper stay 96 can pass through an opening defined by the strap 94. The rearward, upper stay 96 can be attached indirectly to the rearward tubular member 36 using a pair of conventional fasteners, such as bolts 100. Each of the bolts 100 can be threaded into a respective one of a pair of embossments 98 attached to the rearward tubular member 36 (e.g., welded), to attach the strap 94 to the rearward, upper stay 96 and to the rearward tubular member 36. The rearward, upper stay 96 can be configured the same as, similar to, or different than, the upper stays 88 fastened to the upper tubular member 38 of roll cage 30. Alternatively, an upper stay can be provided that passes through the opening defined by the strap 94, and that is attached directly to the rearward tubular member 36.

Figure 10:
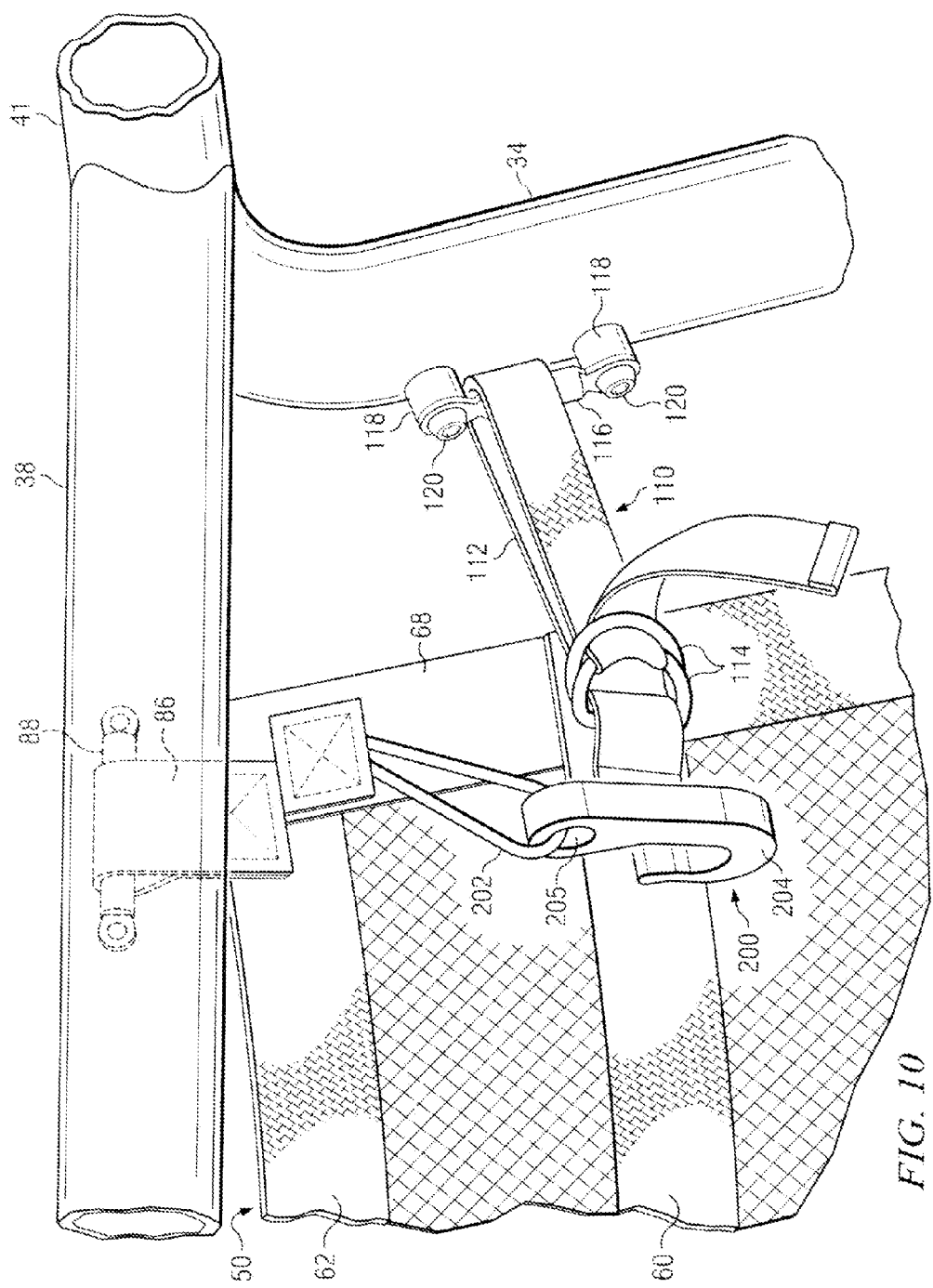
FIG. 10 is an enlarged, fragmentary perspective view depicting an inside, upper, forward portion of the net structure shown in FIGS. 1, 2, 3A and 3B, including a retainer assembly and a strap assembly, and an associated portion of the roll cage of the vehicle shown in FIGS. 1, 2, 3A and 3B, with the retainer assembly detached from the roll cage and with the strap assembly releasably attached to the roll cage.

The net structure 50 can further include a strap assembly 110 that can be attached to the reinforcement structure 54 of net structure 50, e.g., the fourth portion 68 of the perimeter strip 58, and that can be releasably attached to the forward tubular member 34 of the roll cage 30 to releasably attach an upper portion of the net structure 50 to the forward tubular member 34 of the roll cage 30. As shown in FIG. 10, the strap assembly 110 can include a strap 112 attached to the reinforcement structure 54 and a pair of D-rings 114 that can be attached to the reinforcement structure 54 of the net structure 50 using strap 112. A forward, upper stay 116 can be attached to the forward tubular member 34 of the roll cage 30 at a location proximate the upper tubular member 38 of roll cage 30. As shown in FIG. 10, the forward, upper stay 116 can be fastened to a pair of embossments 118, which can be attached to the forward tubular member 34 (e.g., welded), using conventional fasteners such as bolts 120. It will be appreciated that a stay or bracket having a different configuration can be provided and/or that is attached directly to the forward tubular member 34, for use with the strap assembly 110. The strap 112 can be wrapped at least partially around the forward, upper stay 116 and can be releasably attached to the D-rings 114, as shown in FIG. 10, to releasably attach the strap assembly 110 to the forward, upper stay 116, and therefore to the forward tubular member 34 of roll cage 30 at a location proximate the upper tubular member 38. The forward, upper stay 116 and the rearward, upper stay 96 can be spaced from the upper tubular member 38 of roll cage 30 by approximately the same distance. However, in other embodiments, stays 96 and 116 can be spaced from the upper tubular member 38 by differing distances.

In other embodiments, the positions of the strap 94 and strap assembly 110 can be reversed, such that the strap 94 is attached to the fourth portion 68 of perimeter strip 58 and to the forward, upper stay 116, and such that the strap assembly 110 is attached to the third portion 66 of the perimeter strip 58 and is releasably attached to the rearward, upper stay 96. In still other embodiments, strap 94 can be attached to the rearward, upper stay 96 as shown and another strap can be attached to the forward, upper stay 116 in lieu of strap assembly 110, or alternatively, strap assembly 110 can be releasably attached to the forward, upper stay 116 as shown and another strap assembly can be used in lieu of strap 94 and releasably attached to the rearward, upper stay 96. Also, in other embodiments, one or more strap assemblies can be used in lieu of one or more of the straps 86 and each can be releasably attached to a respective one of the upper stays 88, or alternatively each of the strap assemblies can be releasably attached to a single upper stay used in lieu of the upper stays 88 and attached to the upper tubular member 38.

Figure 16:
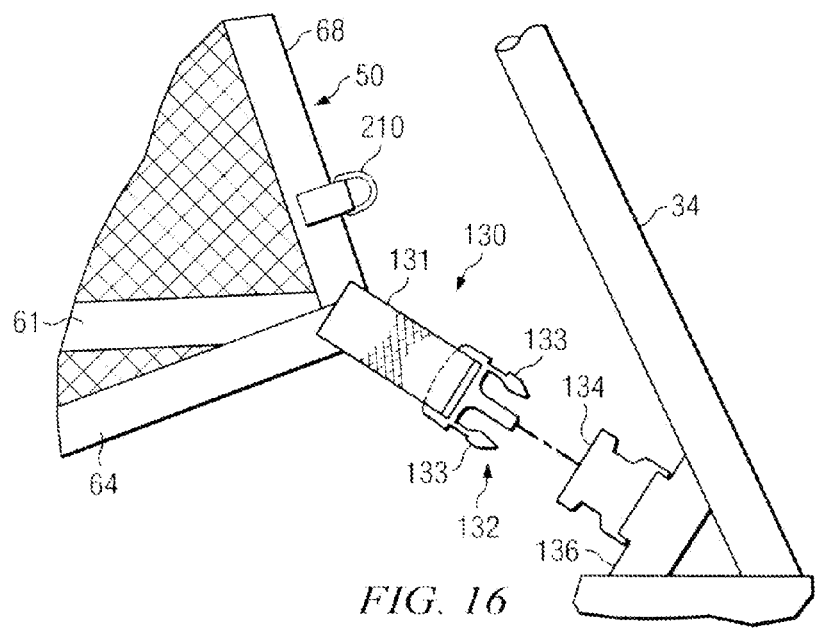
FIG. 16 is a fragmentary elevational view depicting a latch assembly and associated portions of the net structure and the roll cage shown in FIGS. 1, 2, 3A and 3B.

A latch assembly 130 can be provided for use by an operator in releasably attaching net structure 50 to a lower portion of the forward tubular member 34 of the roll cage 30, and selectively locking the net structure 50 in the lowered, closed configuration shown in FIG. 1. As shown in FIG. 16, the latch assembly 130 can include a first interlocking portion 132 and a second interlocking portion 134 that can be configured to selectively interlock with one another. The first interlocking portion 132 can be attached to the net structure 50 via a strap 131 that can be attached at one end to the reinforcement structure 54 of net structure 50, and at the opposite end to the first interlocking portion 132.

In one embodiment, as shown in FIGS. 6, 7 and 16, the first interlocking portion 132 can be a male member that can include one or more flexible fingers 133. The second interlocking portion 134 can be a female member and can be attached to a flange 136 that can be attached to a lower portion of the forward tubular member 34. The first interlocking portion 132 can selectively engage the second interlocking portion 134 in a snap fit that can releasably attach a lower portion of the net structure 50 to the forward tubular member 34, as shown in FIG. 1. The first interlocking portion 132 can be disengaged, or detached, from the second interlocking portion 134 by depressing the flexible fingers 133 and withdrawing the first interlocking portion 132 from the second interlocking portion 134. Alternatively, it will be appreciated that a male member of a latch assembly can be attached to the forward tubular member 34 and a mating female member of a latch assembly can be attached to net structure 50, and that further, mechanical interlocking arrangements having other configurations can be utilized.

The net structure 50 can include one or more clip assemblies that can be configured for releasable attachment to the roll cage 30 of vehicle 10. Referring to FIGS. 6, 7 and 11-13, the net structure 50 can include a plurality of clip assemblies 140 that can be configured for releasable attachment to the roll cage 30 of vehicle 10. The net structure 50 is shown to include three of the clip assemblies 140. However, in other embodiments, different quantities of clip assemblies 140 can be used, and/or clip assemblies having different configurations can be used. Clip assembly 140 can include a flexible member 142 that can be attached to the reinforcement structure 54 of the net structure 50. The flexible member 142 can be a strap, which can be made from any suitable material, e.g., nylon webbing. The flexible member 142 of each of the clip assemblies 140 can be attached to the perimeter strip 58 of the reinforcement structure 54. As shown in FIG. 6, the flexible member 142 of one of the clip assemblies 140 can be attached to the third portion 66 of the perimeter strip 58 and can also be attached to the lower connecting strip 61. The flexible member 142 of the lowermost one of the clip assemblies 140 can be attached to each of the second and third portions 64, 66 of the perimeter strip 58. It will be appreciated that clip assemblies 140 can be attached to net structure 50 in other suitable locations.

Figure 11:
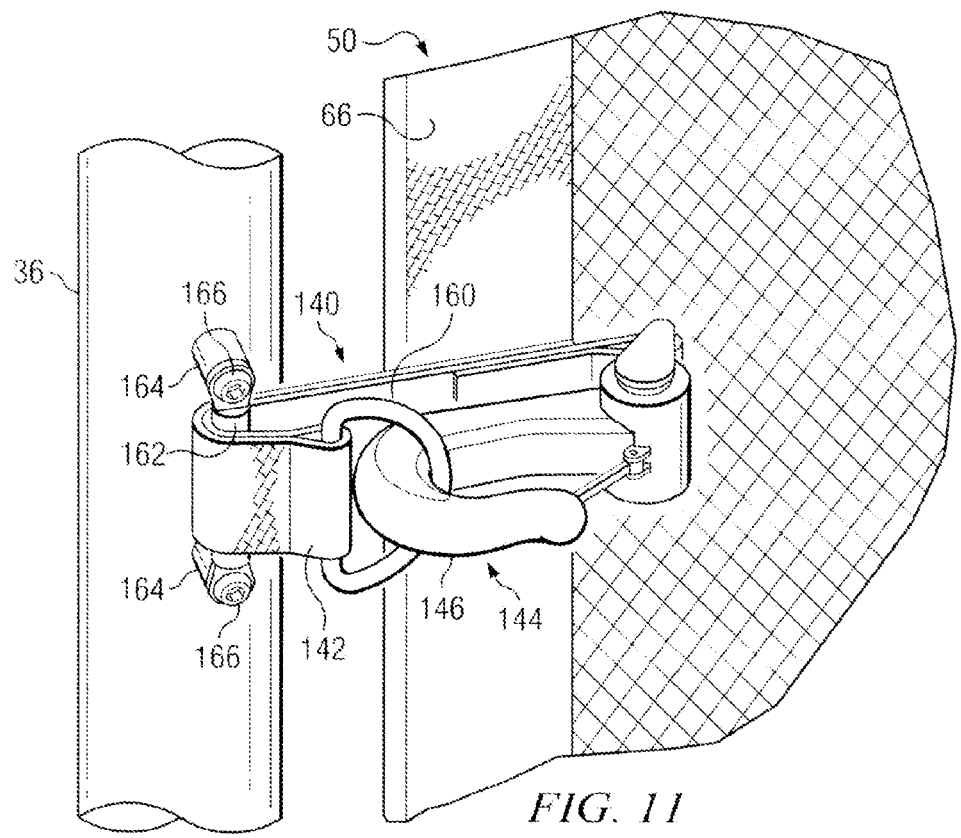
FIG. 11 is an enlarged perspective view depicting an inside, lower, rearward portion of the net structure shown in FIGS. 1, 2, 3A and 3B, and a portion of the rearward tubular member of the roll cage of the vehicle shown in FIGS. 1, 2, 3A and 3B, with a clip assembly of the net structure being depicted as releasably attached to the rearward tubular member.
Figure 13:
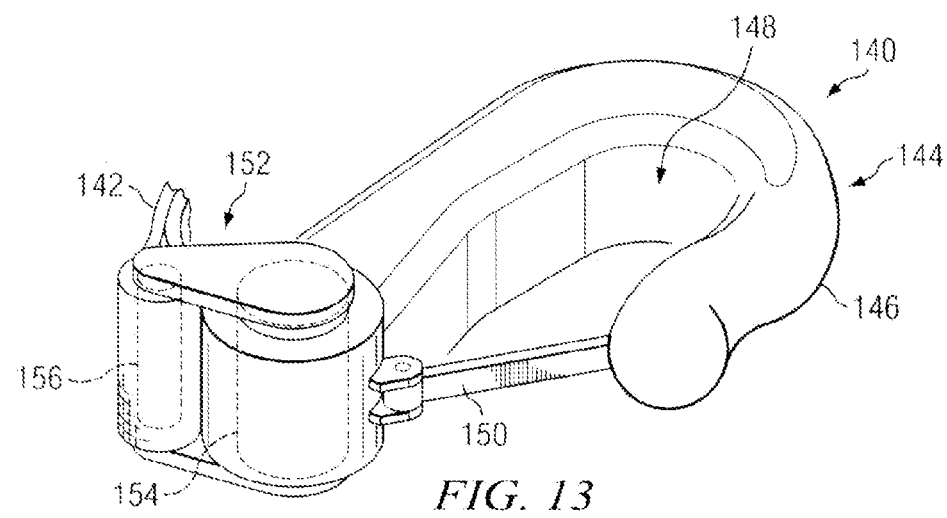
FIG. 13 is an enlarged perspective view of a portion of the clip assembly shown in FIGS. 11 and 12.

With reference to FIGS. 11-13, clip assembly 140 can include a clip 144 associated with the flexible member 142. The clip 144 can be pivotally connected to the flexible member 142. The clip 144 can include a hook 146 and a gate 150 that can cooperate to define an aperture 148. The gate 150 that can be pivotable with respect to hook 146 to selectively open and close an entrance to the aperture 148. The clip assembly 140 can also include a connector 152. The clip 144 can be pivotally attached to the connector 152, and the connector 152 can be pivotally attached to the flexible member 142. Accordingly, the clip 144 can be pivotable with respect to the flexible member 142. The hook 146 of the clip 144 can be pivotable about an axis (not shown) that can extend through a first pivot member 154 of the connector 152. A second pivot member 156 of the connector 152 can pass through a loop defined by the flexible member 142, such that the connector 152 can be pivotable about an axis (not shown) that extends through the second pivot member 156 of connector 152, with respect to the flexible member 142.

The clip assembly 140 can further include a ring member 160 that can be attached to the flexible member 142 at a location that is spaced apart from the location at which the clip 144 is attached to the flexible member 142. The ring member 160 is shown to be a D-ring. However, it will be appreciated that suitable ring members can have alternative shapes and configurations. One or more rearward stays, or brackets, 162 can be attached to the rearward tubular member 36 of the roll cage 30. A like quantity of rearward stays 162 and clip assemblies 140 can be provided, such that each of the clip assemblies 140 can be releasably attached to a respective one of the rearward stays 162. In other embodiments, each of the clip assemblies 140 can be releasably attached to a single rearward stay, which can be attached to the rearward tubular member 36. Each of the rearward stays 162, or alternative stays having different configurations, can be attached either directly or indirectly to the rearward tubular member 36 and each of the rearward stays 162 can be positioned below the rearward, upper stay 96. In one embodiment, each of the rearward stays 162 can be fastened to a pair of embossments 164, which are attached to the rearward tubular member 36, using conventional fasteners, such as bolts 166, as shown in FIG. 11 for one of the rearward stays 162. Each of the rearward stays 162 can cooperate with the respective pair of embossments 164 and the rearward tubular member 36 to define an aperture that can be sized and configured to receive the flexible member 142.

For each of the clip assemblies 140, the flexible member 142 can be wrapped at least partially around a respective one of the rearward stays 162, and the clip 144 can be releasably attached to the ring member 160 to releasably attach the clip assembly 140 to a respective one of the rearward stays 162 and therefore to the rearward tubular member 36 of the roll cage 30. The gate 150, which can be biased in a closed position, facilitates retaining a portion of the ring member 160 within the aperture 148 defined by the hook 146 of the respective clip 144. The selective, releasable attachment of the clip assemblies 140 to the rearward tubular member 36 of roll cage 30, releasably attaches the portion of net structure 50 below strap 94 to the rearward tubular member 36 of the roll cage 30.

Figure 14:
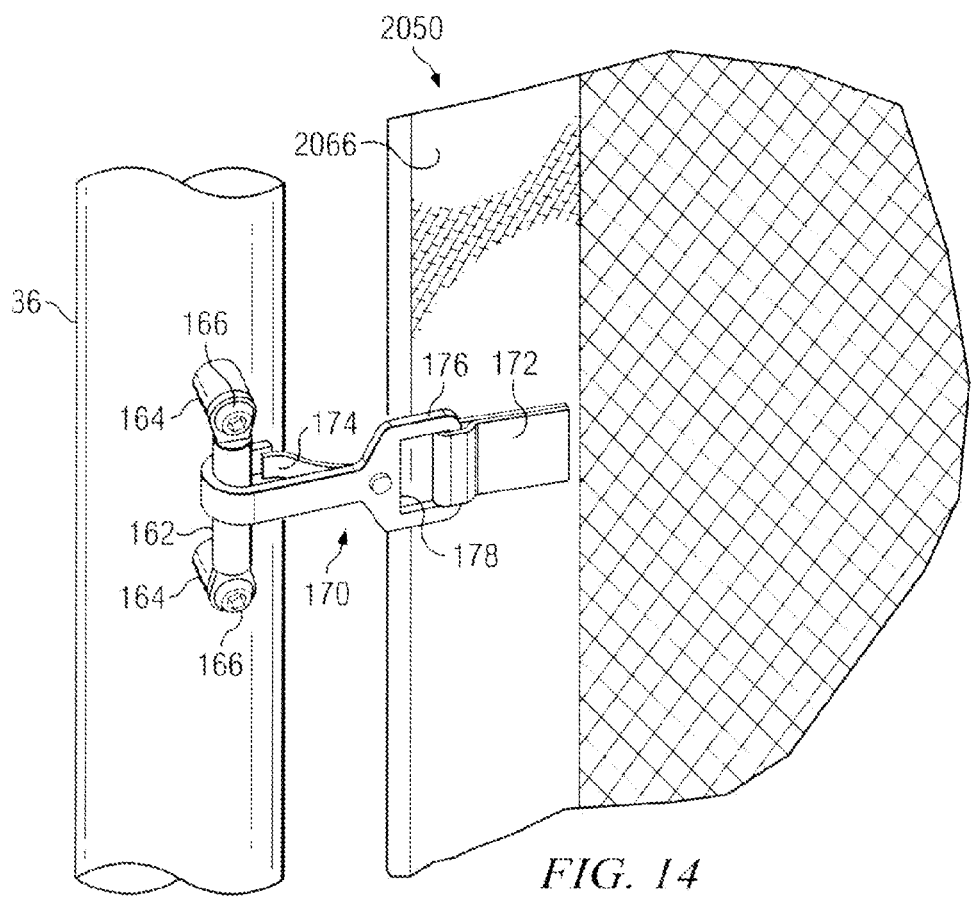
FIG. 14 is an enlarged, fragmentary perspective view similar to FIG. 11, but depicting a clip assembly according to another embodiment.

FIG. 14 illustrates a clip assembly 170 according to an alternative embodiment. One or more of the clip assemblies 170 can be used in lieu of and/or in addition to, the clip assemblies 140, to releasably attach a portion of a net structure 2050, which can otherwise be the same as, or similar to, the net structure 50, to the rearward tubular member 36 of the roll cage 30. For example, the net structure 2050 can include a plurality of the clip assemblies 170 (one shown), with each of the clip assemblies 170 being releasably attached to a respective one of the rearward stays 162, which can be attached to the rearward tubular member 36 of the roll cage 30 as described previously. Clip assembly 170 can include a flexible member 172 that can be attached to a reinforcement structure of the net structure 2050. In one embodiment, the flexible member 172 can be attached to a perimeter strip, e.g., a third portion 2066 of the perimeter strip (e.g., via adhesive and/or sewing). Clip assembly 170 can also include a clip 174 associated with the flexible member 172. The clip 174 can include an end flange 176 that can define an aperture 178. The flexible member 172 can be looped through the aperture 178 to attach the flexible member 172 to the clip 174. The clip 174 of each clip assembly 170 can be releasably attached to a respective one of the rearward stays 162, as shown in FIG. 14 for one of the clip assemblies 170, or alternatively all of the clip assemblies 170 can be releasably attached to a single rearward stay attached to the rearward tubular member 36.

Figure 15:
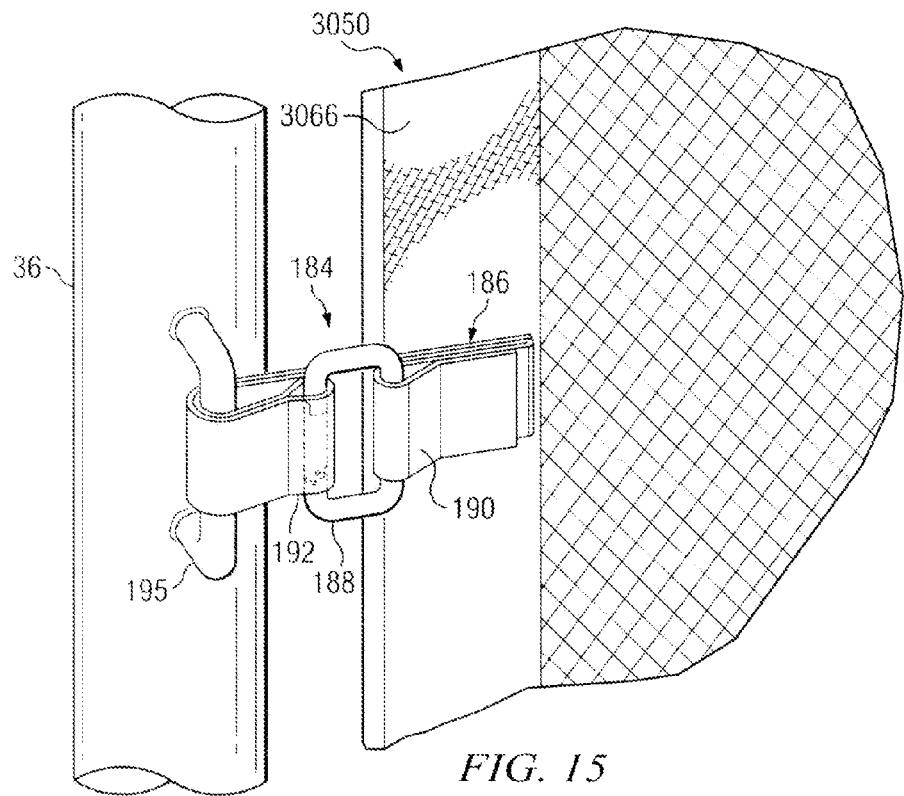
FIG. 15 is an enlarged, fragmentary perspective view similar to FIG. 11, but illustrating a clip assembly according to another embodiment.

FIG. 15 illustrates a clip assembly 184 according to another alternative embodiment, which can be used in lieu of and/or in addition to one or more of the clip assemblies 140 or the clip assemblies 170, to releasably attach a portion of a net structure 3050, which can otherwise be the same as, or similar to, net structure 50, to the rearward tubular member 36 of roll cage 30. For example, the net structure 3050 can include a plurality of the clip assemblies 184 (one shown), with each of the clip assemblies 184 being selectively, releasably attached to the rearward tubular member 36 of roll cage 30. In one embodiment, a plurality of rearward stays 195 (one shown) can be attached directly to the rearward tubular member 36 of roll cage 30, for example by welding the rearward stays 195 to the rearward tubular member 36. Like quantities of the clip assemblies 184 and rearward stays 195 can be provided, such that each of the clip assemblies 184 can be releasably attached to a respective one of the rearward stays 195. In other embodiments, each of the clip assemblies 184 can be attached to a single rearward stay, which can be attached to the rearward tubular member 36. Clip assembly 184 can include a flexible member 186 and a clip 188 that can be a carabiner-type clip. The flexible member 186 can be attached to a reinforcement structure of net structure 3050 (e.g., a third portion 3066 of a perimeter strip of the reinforcement structure) and can define a first looped portion 190 proximate the perimeter strip of the reinforcement structure. The flexible member 186 can also define a second looped portion 192 that can be spaced apart from the first looped portion 190. The carabiner-type clip 188 can be releasably attached to the first looped portion 190 of the flexible member 186. The flexible member 186 of each clip assembly 184 can be wrapped at least partially around a respective one of the rearward stays 195, and the carabiner-type clip 188 can be releasably attached to the second looped portion 192 of the flexible member 186 to releasably attach the clip assembly 184 to the rearward stay 195, and therefore to the rearward tubular member 36. The carabiner-type clip 188 can be opened and closed in a manner known in the art, which can facilitate releasably attaching the carabiner-type clip 188 to the looped portions 190, 192 of the flexible member 186.

Figure 2:
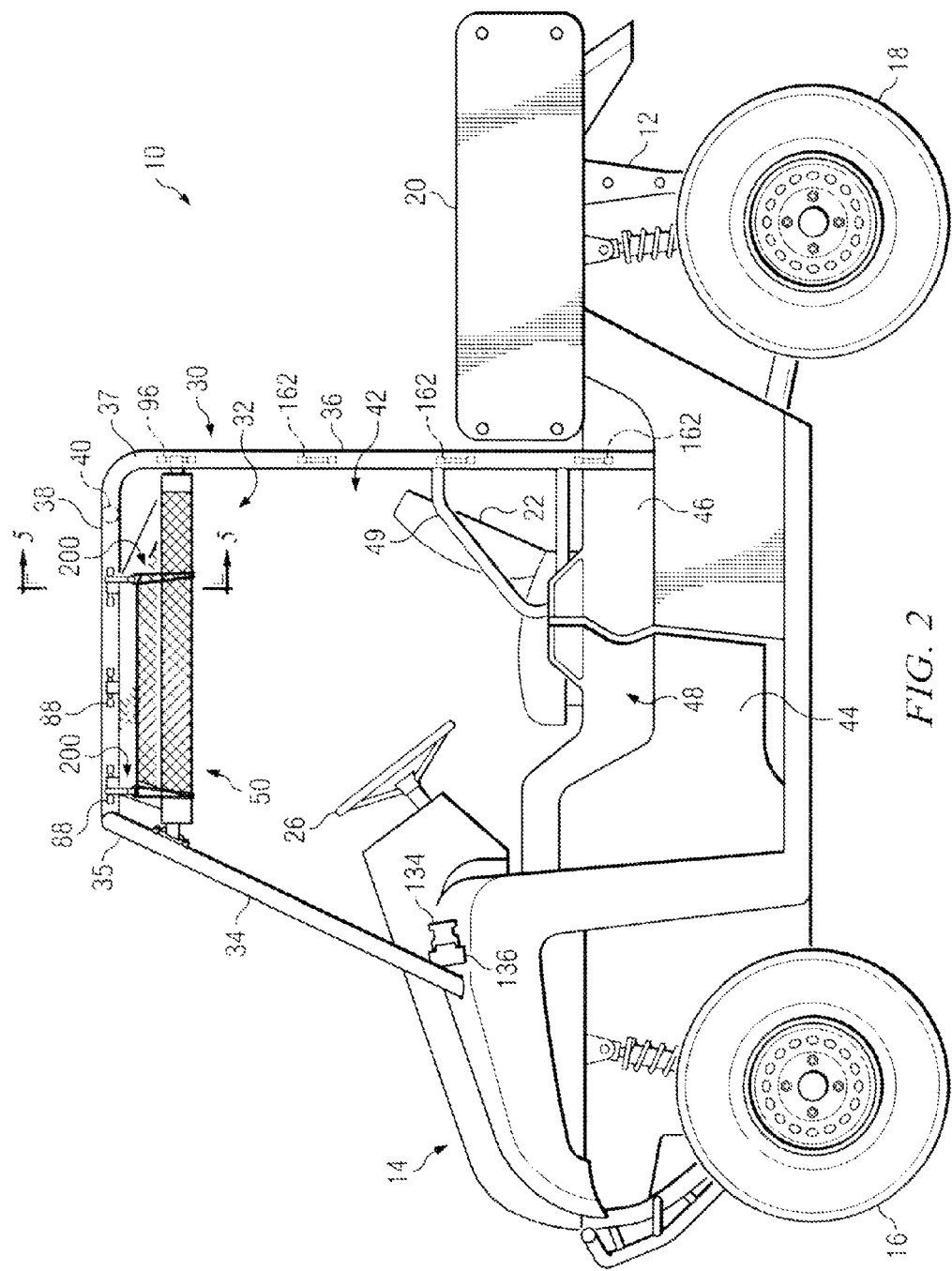
FIG. 2 is a left side elevational view of the vehicle and net structure shown in FIG. 1, but with the net structure depicted in a generally rolled-up, open configuration.

Referring to FIGS. 2, 5A, 5B, 7 and 10, the net structure 50 can further include a plurality of retainer assemblies 200. Each of the retainer assemblies can be attached to the reinforcement structure 54 of the net structure 50, and each of the retainer assemblies 200 can be configured for releasable attachment to the upper tubular member 38 of the roll cage 30, to facilitate selectively retaining the net structure 50 in a generally rolled-up, open configuration, e.g., the generally rolled-up, open configuration shown in FIGS. 2 and 5A, or the alternative generally rolled-up, open configuration shown in FIG. 5B. The net structure 50 can be rolled-up along the outside of net structure 50 as shown in FIGS. 2 and 5A, or alternatively, the net structure 50 can be rolled-up along the inside of net structure 50 as shown in FIG. 5B. Each of the retainer assemblies 200 can include a resilient member 202 and an attachment member 204, and the resilient member 202 can be attached to the attachment member 204.

The resilient member 202 of each of the retainer assemblies 200 can be attached to the reinforcement structure 54 of the net structure 50. For example, the resilient member 202 of each of the retainer assemblies 200 can be attached (e.g., via adhesive and/or sewing) to the perimeter strip 58 of the reinforcement structure 54. In one embodiment, the resilient member 202 of each of the retainer assemblies can be attached to the first portion 62 of the perimeter strip 58. The resilient member 202 can be an elastic cord, or any other suitable resilient member, which can be extended, or lengthened, to facilitate selectively retaining the net structure 50 in a generally rolled-up, open configuration, e.g., as shown in FIGS. 5A and 5B. In another embodiment, retainer assemblies can be provided that each include a non-resilient member attached to a net structure and to an attachment member, and that can be configured for releasable attachment to a roll cage of a vehicle. The resilient member 202 can be looped through an aperture 205 defined by the attachment member 204, to attach the resilient member 202 to the attachment member 204. The attachment member 204 is shown in FIG. 10 to be a hook. Alternatively, attachment members can have other configurations. In one embodiment, an attachment member can be a clip that can include a hook and a gate pivotally attached to the hook.

The net structure 50 can be configured in a lowered, closed configuration, e.g., the lowered, closed configuration shown in FIG. 1, for use during operation of vehicle 10 by releasably attaching the clip assemblies 140 and/or clip assemblies having other configurations (e.g., clip assemblies 170, 184) to the rearward stays 162 and latching or locking the latch assembly 130, in addition to attaching straps 86 to the upper stays 88, attaching strap 94 to the rearward, upper stay 96, and releasably attaching the strap assembly 110 to the forward, upper stay 116.

When vehicle 10 is not being operated, the net structure 50 can be configured in a generally rolled-up, open configuration, e.g., the generally rolled-up, open configuration shown in FIGS. 2 and 5A or the alternative generally rolled-up, open configuration shown in FIG. 5B, to facilitate passage of an operator from the protected area 32 through the access opening 42, to exit vehicle 10, and to facilitate passage of an operator through the access opening 42 into the protected area 32 to board vehicle 10. The net structure 50 can be configured in a generally rolled-up, open configuration, e.g., the generally rolled-up, open configuration shown in FIGS. 2 and 5A or the alternative generally rolled-up, open configuration shown in FIG. 5B, by detaching each of the clip assemblies 140 from the respective ones of the rearward stays 162, or from a single rearward stay, unlatching or unlocking the latch assembly 130, and rolling up a portion of the net structure 50 indicated generally at 206 in FIGS. 5A and 5B. The straps 86 and strap 94 can remain attached to the upper tubular member 38 and the rear tubular member 36, respectively, of roll cage 30, and the strap assembly 110 can remain releasably attached to the forward tubular member 34 of roll cage 30, when the net structure 50 is in a generally rolled-up, open configuration, e.g., the generally rolled-up, open configuration shown in FIGS. 2 and 5A or the alternative generally rolled-up, open configuration shown in FIG. 5B. The rolled-up portion 206 can correspond to all, or substantially all, of the net structure 50 extending below the strap assembly 110 and the strap 94 that can remain attached to the forward tubular member 34 and the rearward tubular member 36, respectively, when the net structure 50 is in a generally rolled-up, open configuration, e.g., the generally rolled-up, open configuration shown in FIGS. 2 and 5A or the alternative generally rolled-up open configuration shown in FIG. 5B. The resilient member 202 of each of the retainer assemblies 200 can then be extended such that the resilient member 202 of each of the retainer assemblies 200 is wrapped at least partially around the generally rolled-up portion 206 of the net structure 50, and the attachment member 204 of each of the retainer assemblies 200 can then be releasably attached to a respective one of the upper stays 88, or to a single upper stay, such that each of the retainer assemblies 200 is releasably attached to the upper tubular member 38 of the roll cage 30, to facilitate retaining the net structure 50 in a generally rolled-up, open configuration e.g., the generally rolled-up, open configuration shown in FIGS. 2 and 5A or the alternative generally rolled-up, open configuration shown in FIG. 5B. The attachment member 204 of each retainer assembly 200 can be received by the aperture 93 defined by the respective one of the upper stays 88, the upper tubular member 38 and the respective ones of the embossments 92.

Figure 3A:
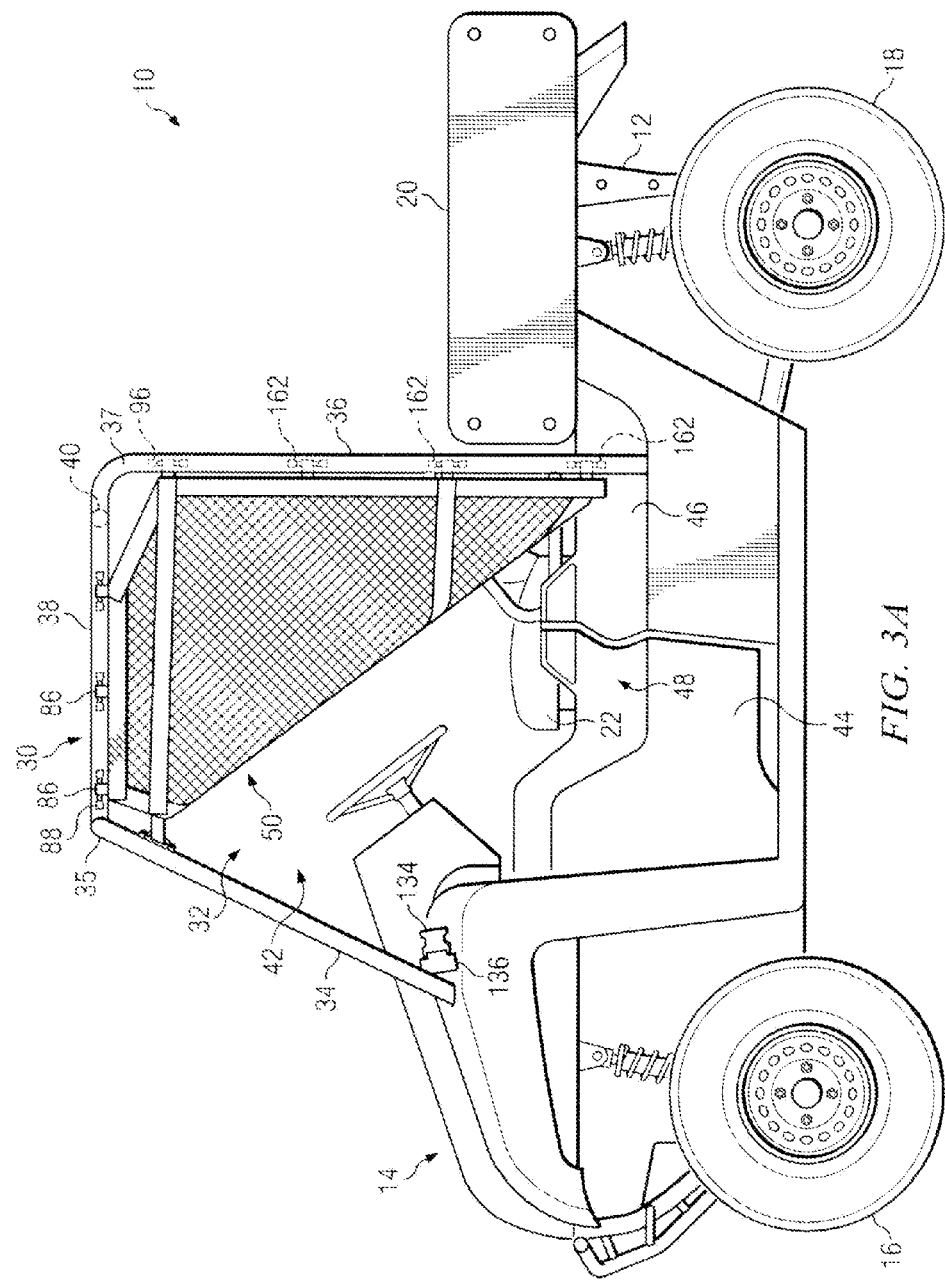
FIG. 3A is a left side elevational view of the vehicle and net structure shown in FIGS. 1 and 2, but with the net structure depicted in a generally diagonally-folded, partially open configuration, with the net structure folded generally diagonally along the inside of the net structure.
Figure 3B:
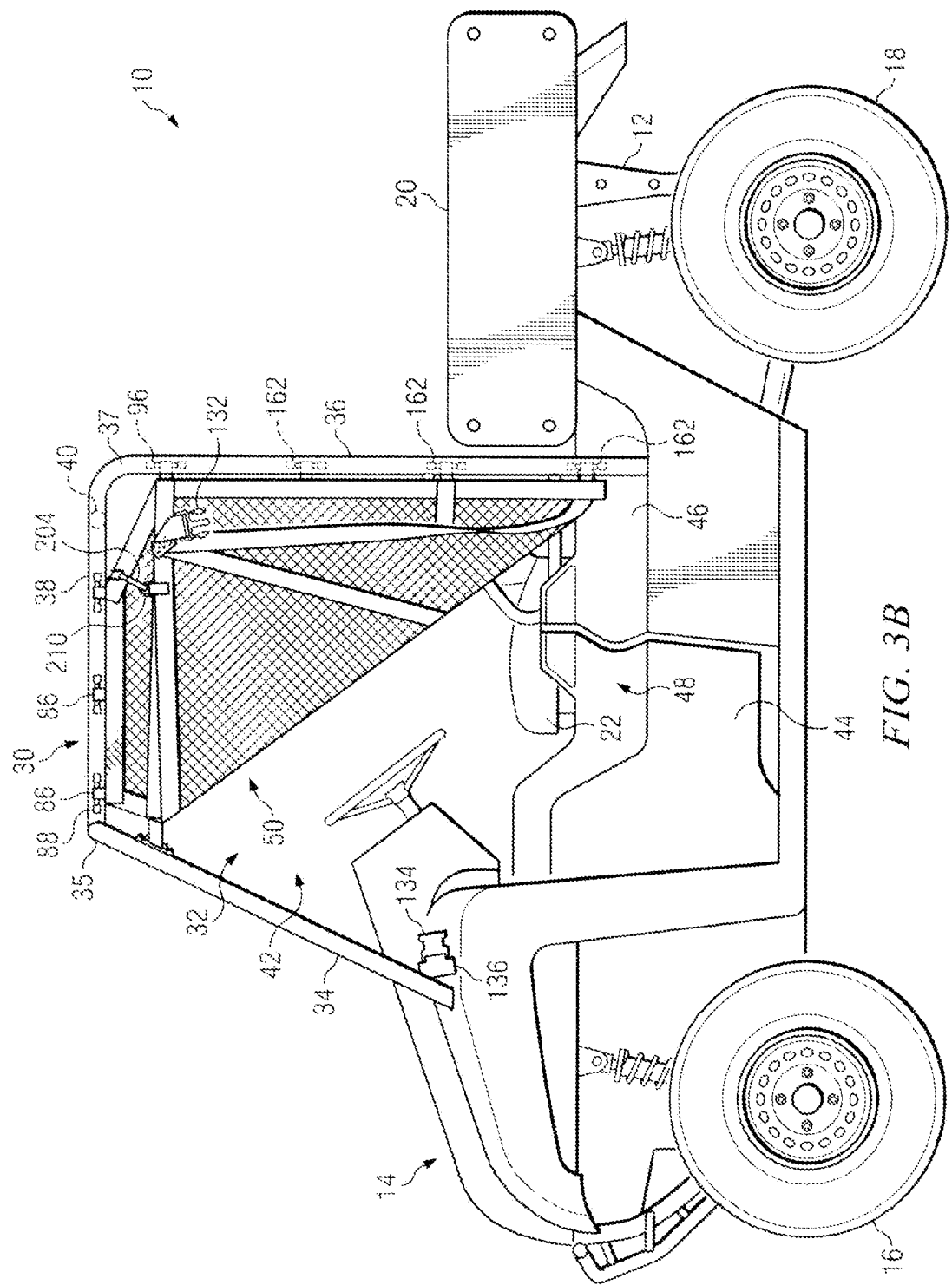
FIG. 3B is a left side elevational view similar to FIG. 3A, but with the net structure folded generally diagonally along the outside of the net structure.

As shown in FIG. 7, the net structure 50 can further include a ring member 210, which can be a D-ring, which can be attached to the reinforcement structure 54 of the net structure 50. In one embodiment, a strap 212 can pass through an aperture defined by the D-ring 210 and can be attached, at both ends, to the perimeter strip 58 of the reinforcement structure 54, to attach the D-ring 210 to the reinforcement structure 54. As shown in FIG. 7, the D-ring 210 can be attached to the fourth portion 68 of the perimeter strip 58 of the reinforcement structure 54. It will be appreciated that D-rings and/or ring members having other configurations can be attached to the reinforcement structure 54 at other locations. The D-ring 210 can be used to facilitate retaining the net structure 50 in a generally diagonally-folded, partially open configuration, e.g., either one of the generally diagonally-folded, partially open configurations shown in FIGS. 3A and 3B. For example, when vehicle 10 is not in operation, the latch assembly 130 can be unlatched or unlocked, the net structure 50 can be generally diagonally-folded and the D-ring 210 can be releasably attached to the attachment member 204 of one of the retainer assemblies 200, as shown in FIG. 3B. The net structure 50 can be generally diagonally-folded along the inside of net structure 50 as shown in FIG. 3A, or alternatively, the net structure 50 can be generally diagonally-folded along the outside of net structure 50 as shown in FIG. 3B.

The net structure 50 can also include a strap assembly 214 (FIG. 7) that can be attached to the reinforcement structure 54 of the net structure 50, at a location proximate the hip bolster 49 of vehicle 10. For example, the strap assembly 214 can be attached to the second portion 64 of the perimeter strip 58. The strap assembly 214 can include a pair of D-rings 216 (one shown) and a strap 218. The D-ring 216 can be attached to the second portion 64 of the perimeter strip 58 using the strap 218. When the net structure 50 is in a lowered, closed configuration, e.g., the lowered, closed configuration shown in FIG. 1, the strap 218 can be selectively wrapped at least partially around the hip bolster 49 and releasably attached to the D-rings 216, in order to facilitate further retention and tensioning of the net structure 50 when the net structure 50 is in a lowered, closed configuration, e.g., the lowered, closed configuration shown in FIG. 1.

If a rollover event occurs during operation of vehicle 10, with the net structure 50 and/or net structure 1050 in respective lowered, closed configurations, as shown in FIGS. 1 and 4, respectively, an operator of vehicle 10 may impact one of the net structures, for example the net structure 50, which is adjacent to the operator. In this event, the operator's body applies a force to the net structure, such as net structure 50, which can cause the net structure 50 to deflect outwardly. This may also occur if net structure 2050, net structure 3050, or net structures having other configurations are used and are in respective lowered, closed configurations adjacent the operator of vehicle 10. This deflection can cause forces, such as tensile forces, to be applied to one or more of the means for attaching the net structure 50 to the roll cage 30. In some instances, this can result in one or more of the means for attaching the net structure 50 to the roll cage 30 becoming at least partially detached from the reinforcement structure 54 of the net structure 50, such that the structural integrity of the net structure 50 is compromised. In such an instance, it can be desirable to replace the net structure 50.

The net structure 50 (FIGS. 1, 2, 3A and 3B), net structure 1050 (FIG. 4), net structure 2050 (shown partially in FIG. 14), net structure 3050 (shown partially in FIG. 15), or net structures having other configurations, can include one or more overload indicators, to facilitate identifying when the structural integrity of the particular net structure has been compromised, such that replacement of the net structure may be warranted. Overload indicators can be associated with any of a wide variety of means for attaching a net structure (e.g., 50) to a roll cage (e.g., 30). In one embodiment, net structure 50 can include an overload indicator 300 that can be associated with one of the clip assemblies 140 of net structure 50, as shown in FIGS. 17A-17C.

The overload indicator 300, flexible member 142 of clip assembly 140, and the reinforcement structure 54 of net structure 50 can be attached to one another using various methods, for example using thread, adhesives, rivets, heat welding or any other suitable method that is compatible with the particular materials of construction of overload indicator 300, flexible member 142 and reinforcement structure 54. Additionally, the overload indicator 300 can be attached separately to either the flexible member 142 or the reinforcement structure 54, using any suitable method.

Figure 17A:
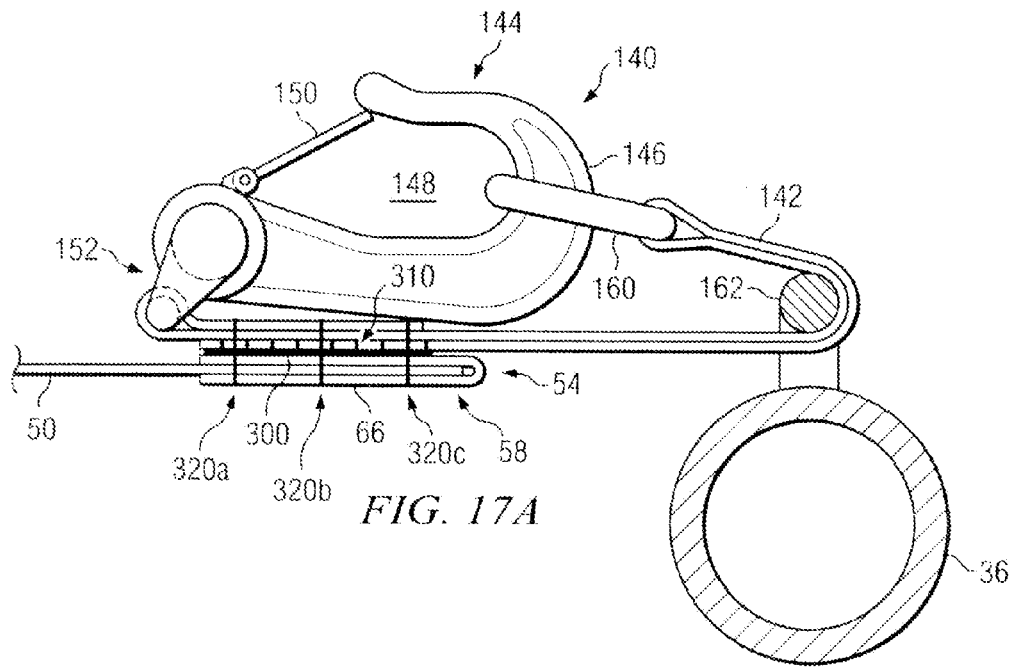
FIG. 17A is a cross-sectional view similar to FIG. 12, but also depicting an overload indicator according to one embodiment, with the overload indicator being attached to one of the clip assemblies depicted in FIGS. 11-13 and to a reinforcement structure of the net structure of FIGS. 1-4.
Figure 17B:
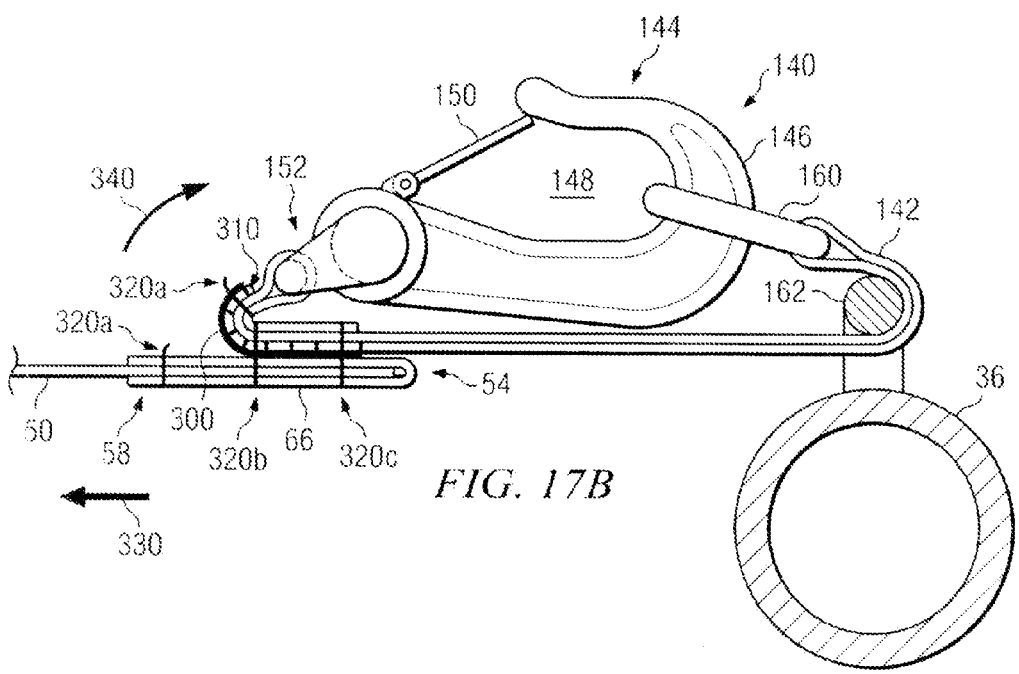
FIG. 17B is a cross-sectional view similar to FIG. 17A, but with the overload indicator shown in FIG. 17A being partially separated from the reinforcement structure of the net structure.

In one embodiment, overload indicator 300 can be a patch, that can be attached separately to flexible member 142 using thread, for example with a plurality of rows 310 of stitching as shown in FIGS. 17A and 17B (not shown in FIG. 17C for clarity of illustration). Overload indicator 300 can be sewn, or stitched, to each of the flexible member 142 of clip assembly 140 and the third portion 66 of the perimeter strip 58 of the reinforcement structure 54 of net structure 50 using thread, with three rows of stitching, indicated at 320*a*, 320*b* and 320*c*, shown in FIG. 17A. It will be appreciated that other configurations and/or quantities of stitching can be used.

Overload indicator 300 can be a flexible material, e.g., nylon, any other suitable synthetic material, or any suitable fabric, that can move with the flexible member 142, as shown in FIGS. 17B and 17C. In other embodiments, overload indicators can be provided that can be made of a material, e.g., plastic or metal, that is relatively inflexible, such that the overload indicator can remain stationary, or substantially stationary, with respect to the flexible member 142 and the reinforcement structure 54.

While overload indicator 300 is shown in FIGS. 17A-17C to be generally rectangular, overload indicators can be provided having other shapes and having any suitable thickness. Overload indicator 300 can have any suitable color, which can contrast with the color of one or both of the flexible member 142 and the reinforcement structure 54. For example, in one embodiment, each of the flexible member 142 of clip assembly 140 and reinforcement structure 54 of net structure 50 can be silver or black, and the overload indicator 300 can be red or orange. The contrasting color of overload indicator 300 can facilitate detection of overload indicator 300 by an operator of vehicle 10, or other person associated with vehicle 10, when the structural integrity of net structure 50 has been compromised.

The overload indicator 300 can be at least substantially entirely, i.e., substantially entirely or entirely, obscured from an operator's view, or that of other persons such as other occupants of vehicle 10 or maintenance personnel associated with vehicle 10, by at least one of the third portion 66 of the perimeter strip 58 of the reinforcement structure 54, and the flexible member 142 of the clip assembly 140, until such time that a tensile force, which is equal to or greater than a predetermined tensile force, is applied to the flexible member 142, wherein at least a portion of the overload indicator 300 is visible and indicates that the structural integrity of the net structure 50 has been compromised. For example, as shown in FIG. 17A, the flexible member 142 and the third portion 66 of the perimeter strip 58 are shown to cooperate to substantially entirely obscure the overload indicator 300, prior to the net structure 50 being overloaded.

As shown in FIG. 17A, and as discussed previously in conjunction with FIGS. 11-13, the flexible member 142 of clip assembly 140 can be attached to a ring member 160 of clip assembly 140 and can be pivotally connected to the clip 144 of clip assembly 140, via connector 152. The flexible member 142 can wrap at least partially around one of the rearward stays 162 attached to the rearward tubular member 36 of roll cage 30 when the net structure 50 is in a lowered, closed configuration. If a rollover event occurs during operation of vehicle 10, with the net structure 50 in a lowered, closed configuration, an operator of vehicle 10 may impact the net structure 50, causing the net structure 50 to deflect outwardly. This can cause a tensile force, indicated generally with arrow 330 in FIG. 17B, to be applied to the third portion 66 of perimeter strip 58 of reinforcement structure 54, and to the flexible member 142 of clip assembly 140, with the tensile force 330 being applied in a generally forward direction away from the rearward tubular member 36 of roll cage 30.

The tensile force 330 can cause the ring member 160 and clip 144 to be pulled rearward toward the rearward stay 162 attached to the rearward tubular member 36 of roll cage 30, as will be appreciated by comparing the positions of ring member 160 and clip 144 shown in FIG. 17B to the position of ring member 160 and clip 144 shown in FIG. 17A. Due to the pivotal connection of clip 144 to the flexible member 142, via connector 152, movement of the ring member 160 and clip 144 toward the rearward stay 162 can result in connector 152 applying a force to the flexible member 142 that can cause one or more of the rows of stitching to break (e.g., 320a as shown in FIGS. 17B and 17C). In this event, at least a portion of the flexible member 142, and at least a portion of the overload indicator 300 can separate from, and rotate away from, the third portion 66 of the perimeter strip 58 as shown in FIGS. 17B and 17C, with the direction of rotation indicated generally by arrow 340 in FIG. 17B. As a result, this portion of the overload indicator 300 can be visible, which provides an indication to an operator or other person associated with vehicle 10 that the structural integrity of the net structure 50 has been compromised, such that replacement of the net structure 50 may be warranted.

Figure 18A:
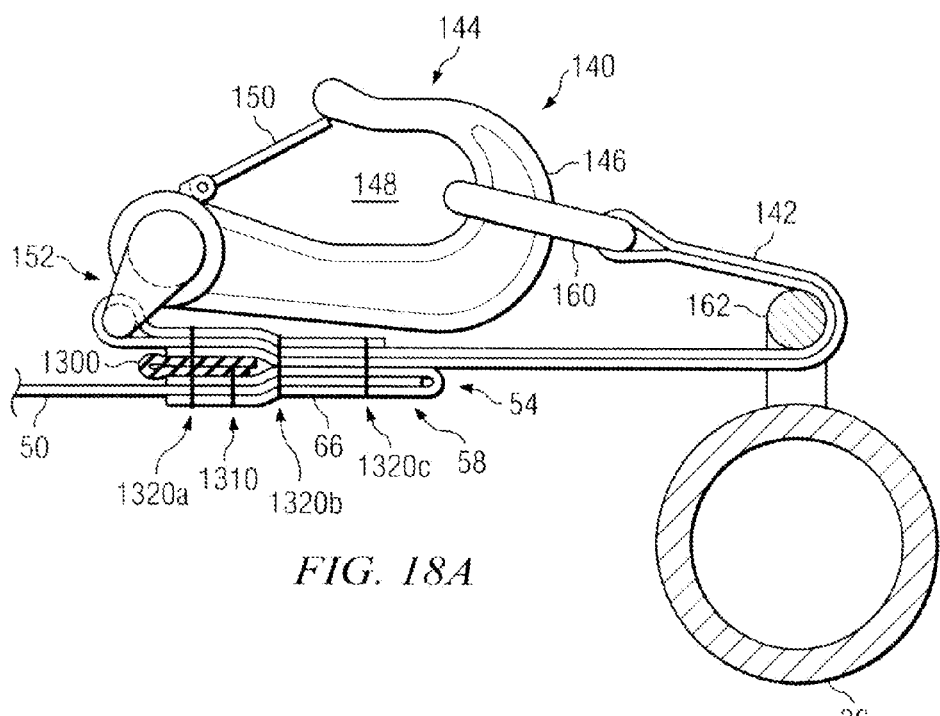
FIG. 18A is a cross-sectional view similar to FIG. 17A, depicting an overload indicator according to another embodiment.
Figure 18B:
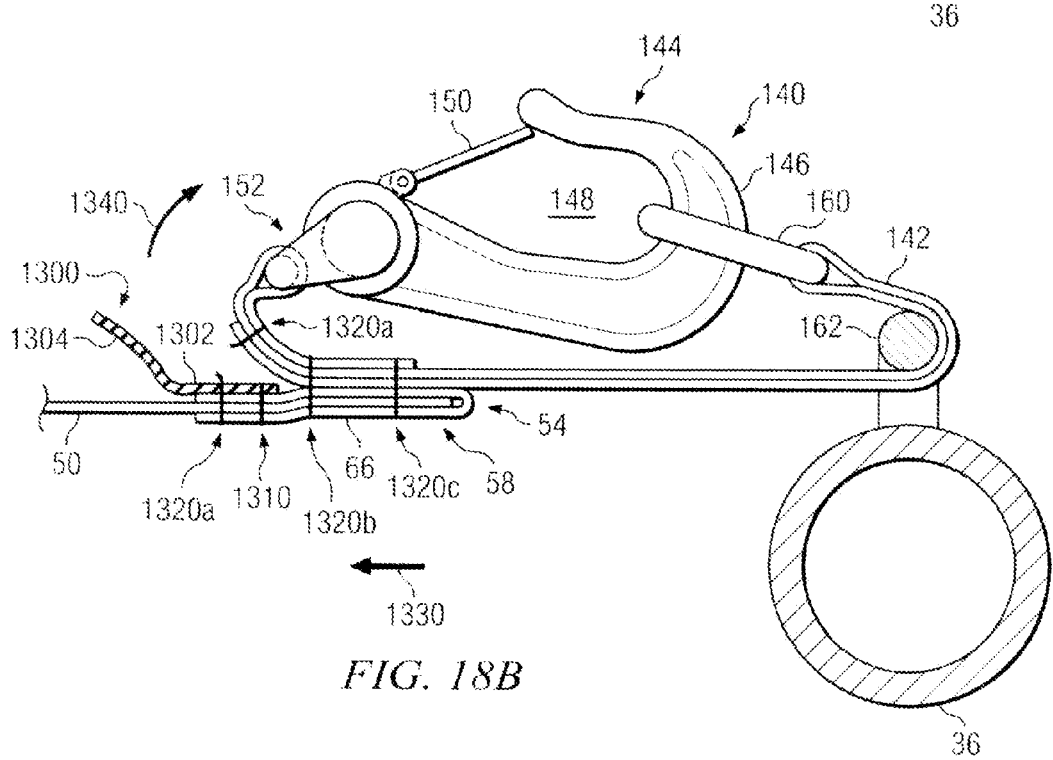
FIG. 18B is a cross-sectional view similar to FIG. 17B, with a portion of the flexible member of the clip assembly being separated from the reinforcement structure of the net structure, such that a portion of the overload indicator is spaced apart from each of the flexible member of the clip assembly and the reinforcement structure of the net structure.

FIGS. 18A and 18B illustrate an overload indicator 1300 according to another embodiment. The overload indicator 1300 can be a flag and can be made of a resilient material. For example, the overload indicator 1300 can be made of an elastomeric material, such as natural or synthetic rubber. The overload indicator 1300 can be a unitary member that can include a first portion 1302 and a second portion 1304 that are integral with one another. Overload indicator 1300 can have a color that contrasts with a color of the flexible member 142 and/or a color of reinforcement structure 54.

The overload indicator 1300, flexible member 142 of clip assembly 140, and reinforcement structure 54 can be attached to one another, and overload indicator 1300 can be attached separately to either the flexible member 142 or reinforcement structure 54, using any suitable method. In one embodiment, the first portion 1302 of the overload indicator 1300 can be sewn, with one or more rows 1310 of thread stitching, to the third portion 66 of the perimeter strip 58 of reinforcement structure 54 as shown in FIGS. 18A and 18B. The flexible member 142 is shown in FIGS. 18A and 18B to be sewn to the third portion 66 of the perimeter strip 58 of the reinforcement structure 54 using thread, with three rows of stitching indicated at 1320a, 1320b and 1320c, being shown in FIGS. 18A and 18B. However, it will be appreciated that different configurations and/or amounts of stitching, other than that shown, can be used to sew the flexible member 142 to the reinforcement structure 54. As shown in FIG. 18A, the row of stitching 1320a can also attach both the first and second portions 1302, 1304 of the overload indicator 1300 to each of the flexible member 142 and the reinforcement structure 54.

The overload indicator 1300 can be folded and positioned between the flexible member 142 and the third portion 66 of perimeter strip 58 such that the first and second portions 1302, 1304 of overload indicator 1300 are positioned adjacent to, and in contacting engagement with, one another. In this configuration, the overload indicator 1300 can be substantially entirely obscured from view, as shown in FIG. 18A. The overload indicator 1300 can remain in this configuration until such time that the net structure 50 becomes overloaded and the structural integrity of the net structure 50 is compromised.

As discussed previously, if a rollover event occurs during operation of vehicle 10, with the net structure 50 in a lowered, closed configuration, an operator of vehicle 10 may impact the net structure 50, causing net structure 50 to deflect outwardly. This in turn can apply a tensile force, indicated at 1330 in FIG. 18B, to the third portion 66 of the perimeter strip 58 of reinforcement structure 54 and to the flexible member 142 of clip assembly 140, with the tensile force 1330 being applied in a generally forward direction away from the rearward tubular member 36 of roll cage 30.

The tensile force 1330 can cause the ring member 160 and clip 144 to be pulled rearward toward the rearward stay 162 attached to the rearward tubular member 36 of roll cage 30, as will be appreciated by comparing the positions of ring member 160 and clip 144 shown in FIG. 18B to the positions of ring member 160 and clip 144 shown in FIG. 18A. Due to the pivotal connection of clip 144 to the flexible member 142, via connector 152, movement of the ring member 160 and clip 144 toward the rearward stay 162 can result in connector 152 applying a force to the flexible member 142 that can cause one or more of the rows of stitching, such as stitching row 1320a, to break as shown in FIG. 18B. In this event, at least a portion of the flexible member 142 can separate from, and rotate away from, the third portion 66 of the perimeter strip 58, as shown in FIG. 18B, with the direction of rotation indicated generally by arrow 1340. When this occurs, the second portion 1304 of overload indicator 1300 can "spring", or move, away from the flexible member 142, such that the second portion 1304 of overload indicator 1300 is spaced apart from each of the flexible member 142 and the reinforcement structure 54 as shown in FIG. 18B. The first portion 1302 of overload indicator 1300 can remain attached to the reinforcement structure 54 due to stitching 1310. As a result, the second portion 1304 of overload indicator 1300 can be visible, which can facilitate detection of the overload indicator 1300 by an operator or other person associated with vehicle 10, indicating that the structural integrity of net structure 50 has been compromised and that replacement of the net structure 50 may be warranted.

Figure 19:
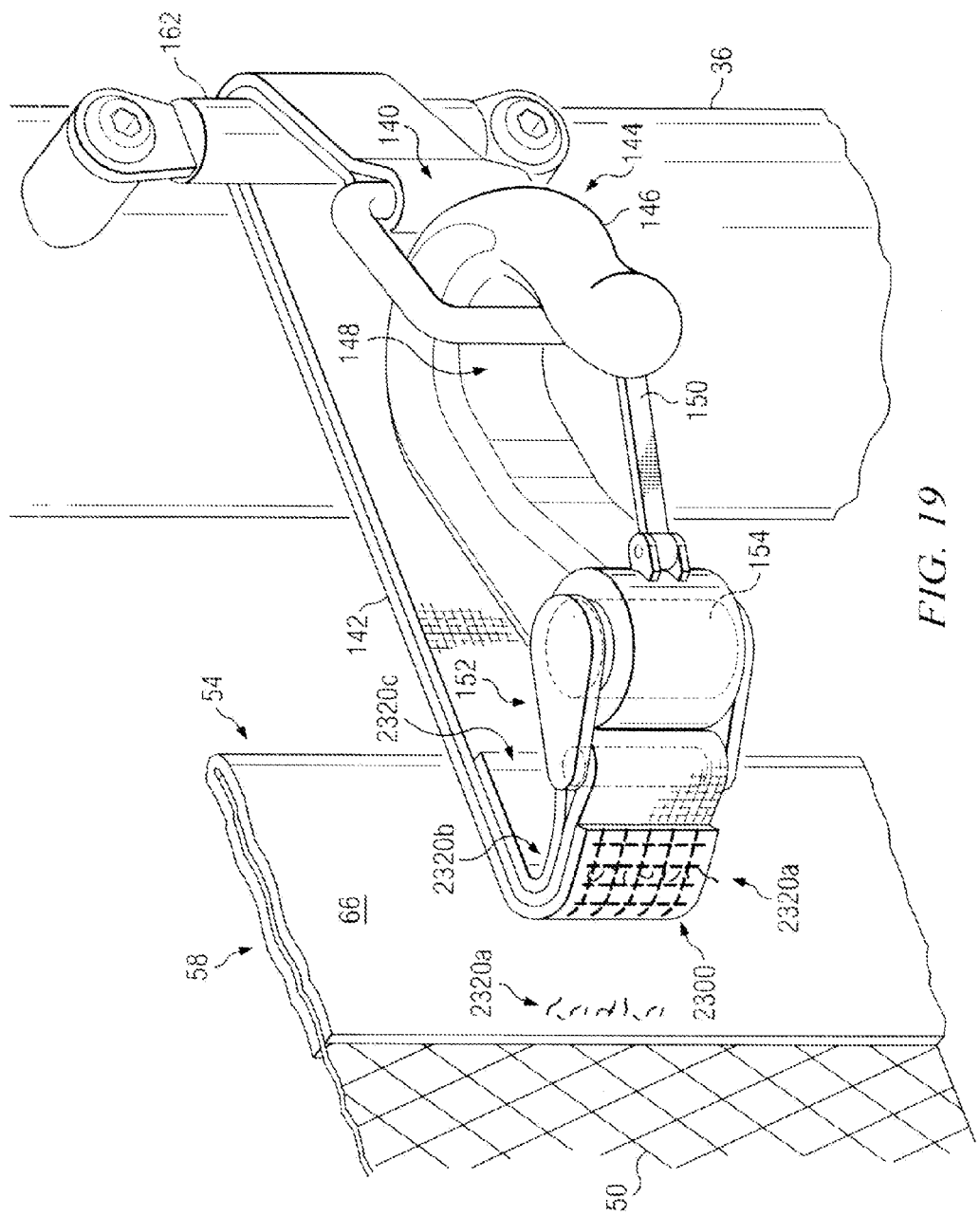
FIG. 19 is a perspective view, similar to FIG. 17C, illustrating an overload indicator according to another embodiment, with the overload indicator being attached to the flexible member of the clip assembly of FIGS. 11-13, and with the flexible member being partially separated from the reinforcement structure of the net structure.

FIG. 19 illustrates an overload indicator 2300 according to another embodiment. The overload indicator 2300 is shown to be a matrix of thread that is sewn, or stitched, to the flexible member 142. The overload indicator 2300 can be at least substantially entirely, i.e., substantially entirely or entirely, obscured from view by an operator or other person associated with vehicle 10, by at least one of the third portion 66 of the perimeter strip 58 of the reinforcement structure 54, and the flexible member 142 of the clip assembly 140, until such time that a tensile force, which is equal to or greater than a predetermined tensile force, is applied to the flexible member 142 wherein at least a portion of the overload indicator 2300 is visible and indicates that the structural integrity of the net structure 50 has been compromised.

The flexible member 142 can be attached to the reinforcement structure 54 using any suitable method, e.g., those discussed previously. Flexible member 142 can be attached to the third portion 66 of the perimeter strip 58 of reinforcement structure 54 using thread, with three rows of stitching, indicated at 2320a, 2320b and 2320c, being shown in FIG. 19. It will be appreciated that other quantities and configurations of stitching can be used to attach the flexible member 142 to the reinforcement structure 54. The row of stitching 2320a is shown to be broken in FIG. 19, which can be a result of a tensile force, in excess of a predetermined tensile force, being applied to the third portion 66 of the reinforcement structure 54 and to the flexible member 142 that can cause a portion of the flexible member 142 to be pulled away from the reinforcement structure 54 as shown in FIG. 19. This facilitates detection of the overload indicator 2300 by an operator or other person associated with vehicle 10, indicating that the structural integrity of the net structure 50 has been compromised and that replacement of the net structure 50 may be warranted.

In another embodiment, an overload indicator can be at least one of dye, ink, paint, or any other suitable substance which can be applied to the flexible member 142. The substance can be applied to the flexible member 142 in an area adjacent to connector 152, for example the same area, or approximately the same area, where overload indicator 2300 is sewn to the flexible member 142 in the embodiment depicted in FIG. 19. Such a substance can have a color (e.g., red or orange) that can contrast with a color (e.g., silver or black) of one or both of the flexible member 142 and the reinforcement structure 54, which can facilitate detection of the overload indicator by an operator or other person associated with vehicle 10, when the flexible member 142 has at least partially separated from the reinforcement structure 54, revealing at least a portion of the overload indicator.

The net structure 50, or other net structure incorporating one or more overload indicators, such as overload indicators 300, 1300, and 2300, can be calibrated together with the respective overload indicator(s), for example in a tensile tester, to determine the load rating of the particular net structure. The use of one or more overload indicators, such as one or more of any or all of the overload indicators 300, 1300, and 2300, with any net structure attached to a roll cage of a vehicle, for example net structures 50, 1050, 2050, and 3050, can provide an indication of when the structural integrity of the respective net structure has been compromised, such that replacement of the net structure may be warranted to enhance the safety of operation of vehicle 10. While the overload indicators 300, 1300, and 2300 have been illustrated in association with the flexible member 142 of clip assembly 140 and the third portion 66 of the perimeter strip 58 of the reinforcement structure 54 of net structure 50, overload indicators such as overload indicators 300, 1300, and 2300 can be used in association with other means to attach the respective net structures (e.g., 50) to a roll cage (e.g., 30) of a vehicle (e.g., 10) and can be associated with other portions of the reinforcement structure 54 of net structure 50. For example, any one of the overload indicators 300, 1300, and 2300, can be used in association with any one of the straps 86, strap 94, strap assembly 112, latch assembly 130, clip assembly 170, clip assembly 184, and strap assembly 214, and in association with the respective portions of the reinforcement structure 54 of net structure 50.

While various embodiments of a net structure for attachment to a roll cage of a vehicle, and a vehicle, have been illustrated by the foregoing description and have been described in considerable detail, it is not intended to restrict or in any way limit the scope of the appended claims to such detail. Additional modifications will be readily apparent to those skilled in the art.

What is claimed is:

1. A net structure for attachment to a roll cage of a vehicle, the net structure comprising:
    a mesh structure;
    a reinforcement structure attached to the mesh structure, each of the mesh structure and the reinforcement structure being flexible;
    means for attaching the net structure to a roll cage of a vehicle, the means for attaching the net structure being attached to the reinforcement structure; and
    an overload indicator associated with the means for attaching the net structure; wherein
    the overload indicator is at least substantially entirely obscured from view by at least one of the reinforcement structure and the means for attaching the net structure, until such time that a tensile force, which is equal to or greater than a predetermined tensile force, is applied to the means for attaching the net structure wherein at least a portion of the means for attaching the net structure separates from the reinforcement structure such that at least a portion of the overload indicator is visible and indicates that the structural integrity of the net structure has been compromised.

2. The net structure of claim 1, wherein:
    the means for attaching the net structure comprises a clip assembly, the clip assembly being configured for releasable attachment to a roll cage of a vehicle.

3. The net structure of claim 1, wherein:
    the overload indicator is attached to at least one of the reinforcement structure and the means for releasably attaching the net structure;
    the overload indicator has a first color and at least one of the reinforcement structure and the flexible member has a second color; and
    the first color is different than the second color.

4. The net structure of claim 1, wherein:
    the means for attaching the net structure comprises a flexible member attached to the reinforcement structure; and
    the overload indicator is fixed to at least one of the flexible member and the reinforcement structure.

5. The net structure of claim 4, wherein:
    the overload indicator comprises thread sewn to the flexible member.

6. The net structure of claim 4, wherein:
    the overload indicator comprises a patch fixedly attached to the flexible member.

7. The net structure of claim 4, wherein:
    the overload indicator comprises a substance applied to the flexible member, the substance comprising at least one of dye, ink and paint.

8. The net structure of claim 4, wherein:
    the flexible member comprises a strap.

9. A net structure comprising:
    a mesh structure;
    a reinforcement structure attached to the mesh structure, each of the mesh structure and the reinforcement structure being flexible;
    means for attaching the net structure to a roll cage of a vehicle, the means for attaching the net structure being attached to the reinforcement structure and configured for attachment to a roll cage of a vehicle; and
    an overload indicator associated with the means for attaching the net structure; wherein
    the overload indicator is at least substantially entirely obscured from view by at least one of the reinforcement structure and the means for attaching the net structure, until such time that a tensile force, which is equal to or greater than a predetermined tensile force, is applied to the means for attaching the net structure wherein at least a portion of the overload indicator is visible and indicates that the structural integrity of the net structure has been compromised;
    the means for attaching the net structure comprises a flexible member attached to the reinforcement structure;
    the overload indicator is fixed to at least one of the flexible member and the reinforcement structure;

the overload indicator comprises a flag positioned between the flexible member and the reinforcement structure;

the flag comprises a first portion fixedly attached to at least one of the flexible member and the reinforcement structure; and the flag further comprises a second portion that is movable relative to each of the flexible member and the reinforcement structure when a tensile force, which is equal to or greater than a predetermined tensile force, is applied to the flexible member such that the second portion of the flag is visible and indicates that the structural integrity of the net structure has been compromised.

10. The net structure of claim 9, wherein:
the flag comprises a resilient material.

11. A net structure comprising:
a mesh structure;
a reinforcement structure attached to the mesh structure, each of the mesh structure and the reinforcement structure being flexible;
means for attaching the net structure to a roll cage of a vehicle, the means for attaching the net structure being attached to the reinforcement structure, the means for attaching the net structure comprising a clip assembly, the clip assembly being configured for releasable attachment to a roll cage of a vehicle;
an overload indicator associated with the means for attaching the net structure; wherein
the overload indicator is at least substantially entirely obscured from view by at least one of the reinforcement structure and the means for attaching the net structure, until such time that a tensile force, which is equal to or greater than a predetermined tensile force, is applied to the means for attaching the net structure wherein at least a portion of the overload indicator is visible and indicates that the structural integrity of the net structure has been compromised;
the clip assembly comprises a flexible member attached to the reinforcement structure and a clip associated with the flexible member;
the overload indicator is fixed to at least one of the flexible member and the reinforcement structure; and
the clip is pivotally connected to the flexible member.

12. A net structure for attachment to a roll cage of a vehicle, the net structure comprising:
a mesh structure;
a reinforcement structure attached to the mesh structure, each of the mesh structure and the reinforcement structure being flexible;
a clip assembly comprising a flexible member and a clip associated with the flexible member, the flexible member being attached to the reinforcement structure, the clip assembly being configured for releasable attachment to a roll cage of a vehicle; and
an overload indicator associated with the flexible member of the clip assembly; wherein
the overload indicator is at least substantially entirely obscured from view by at least one of the reinforcement structure and the flexible member of the clip assembly, until such time that a tensile force, which is equal to or greater than a predetermined tensile force, is applied to the flexible member of the clip assembly wherein at least a portion of the flexible member rotates away from the reinforcement structure such that at least a portion of the overload indicator is spaced from at least one of the flexible member and the reinforcement structure and is visible, indicating that the structural integrity of the net structure has been compromised.

13. A net structure comprising:
a mesh structure;
a reinforcement structure attached to the mesh structure, each of the mesh structure and the reinforcement structure being flexible;
a clip assembly comprising a flexible member and a clip associated with the flexible member, the flexible member being attached to the reinforcement structure, the clip assembly being configured for releasable attachment to a roll cage of a vehicle; and
an overload indicator associated with the flexible member of the clip assembly; wherein
the overload indicator is at least substantially entirely obscured from view by at least one of the reinforcement structure and the flexible member of the clip assembly, until such time that a tensile force, which is equal to or greater than a predetermined tensile force, is applied to the flexible member wherein at least a portion of the overload indicator is visible and indicates that the structural integrity of the net structure has been compromised; and
the clip is pivotally connected to the flexible member.

14. The net structure of claim 13, wherein:
the clip assembly further comprises a ring member and a connector, the ring member being attached to the flexible member and spaced apart from the clip, the connector being pivotally attached to the flexible member, the clip being pivotally attached to the connector; and
the flexible member is configured to wrap at least partially around a stay attached to a roll cage of a vehicle, and the clip is configured for releasable attachment to the ring member, to facilitate releasable attachment of the clip assembly to a roll cage of a vehicle.

15. The net structure of claim 14, wherein:
the overload indicator is attached to at least one of the flexible member and the reinforcement structure.

16. A vehicle comprising:
a roll cage; and
a net structure attached to the roll cage; wherein
the net structure comprises a mesh structure and a reinforcement structure attached to the mesh structure, each of the mesh structure and the reinforcement structure being flexible;
the net structure further comprises means for attaching the net structure to the roll cage, the means for attaching the net structure being attached to the reinforcement structure;
the net structure further comprises an overload indicator, the overload indicator being attached to each of the reinforcing structure and the means for attaching the net structure; and
the overload indicator is at least substantially entirely obscured from view by at least one of the reinforcement structure and the means for attaching the net structure, until such time that a tensile force, which is equal to or greater than a predetermined tensile force, is applied to the means for attaching the net structure wherein at least a portion of the means for attaching the net structure separates from the reinforcement structure such that at least a portion of the overload indicator is spaced from at least one of the reinforcement structure and the means for attaching the net structure and is visible, indicating that the structural integrity of the net structure has been compromised.

17. The vehicle of claim 16, wherein:
the means for attaching the net structure comprises a flexible member attached to the reinforcement structure of the net structure; and
at least a portion of the overload indicator is fixedly attached to each of the flexible member and the reinforcement structure.

18. A vehicle comprising:
a roll cage; and
a net structure attached to the roll cage; wherein
the net structure comprises a mesh structure, a reinforcement structure attached to the mesh structure and an overload indicator, each of the mesh structure and the reinforcement structure being flexible;
the net structure further comprises a clip assembly, the clip assembly comprising a flexible member and a clip, the clip being pivotally connected to the flexible member, the flexible member being attached to the reinforcement structure;
the clip assembly is selectively, releasably attached to the roll cage; and
the overload indicator is at least substantially entirely obscured from view by at least one of the reinforcement structure and the flexible member of the clip assembly, until such time that a tensile force, which is equal to or greater than a predetermined tensile force, is applied to the flexible member of the clip assembly wherein at least a portion of the flexible member separates from the reinforcement structure such that at least a portion of the overload indicator is visible and indicates that the structural integrity of the net structure has been compromised.

19. The vehicle of claim 18, further comprising:
a seat configured to support an operator of the vehicle; wherein
the roll cage at least partially defines a protected area and at least partially defines an access opening communicating with the protected area, the seat being positioned within the protected area; and
the net structure is selectively configurable in a lowered, closed configuration to at least inhibit passage of an operator of the vehicle through the access opening, the net structure being further selectively configurable in a generally rolled-up, open configuration to facilitate passage of an operator of the vehicle through the access opening;
the clip assembly is releasably attached to the roll cage when the net structure is in the lowered, closed configuration; and
the clip assembly is detached from the roll cage when the net structure is configured to facilitate passage of an operator of the vehicle through the access opening.

20. The vehicle of claim 19, further comprising:
a plurality of the clip assemblies; and
a plurality of the overload indicators, each of the overload indicators being associated with a respective one of the clip assemblies.

21. A vehicle comprising:
a roll cage; and
a net structure attached to the roll cage; wherein
the net structure comprises a mesh structure, a reinforcement structure attached to the mesh structure and an overload indicator, each of the mesh structure and the reinforcement structure being flexible;
the net structure further comprises a clip assembly, the clip assembly comprising a flexible member, a connector pivotally attached to the flexible member and a clip pivotally attached to the connector, such that the clip is pivotally connected to the flexible member, the flexible member being attached to the reinforcement structure;
the clip assembly is selectively, releasably attached to the roll cage; and
the overload indicator is at least substantially entirely obscured from view by at least one of the reinforcement structure and the flexible member of the clip assembly, until such time that a tensile force, which is equal to or greater than a predetermined tensile force, is applied to the flexible member of the clip assembly wherein at least a portion of the overload indicator is visible and indicates that the structural integrity of the net structure has been compromised.

22. The vehicle of claim 21, wherein:
the roll cage comprises a tubular member and the vehicle further comprises a stay attached to the tubular member;
the clip assembly further comprises a ring member attached to the flexible member and spaced apart from the clip;
the flexible member is wrapped at least partially around the stay, and the clip is releasably attached to the ring member when the net structure is in a lowered, closed configuration; and
the flexible member is detached from the stay, and the clip is detached from the ring member, when the net structure is in a generally rolled-up, open configuration.

23. The net structure of claim 21, wherein:
the overload indicator comprises thread sewn to the flexible member.

24. The vehicle of claim 21, wherein:
the overload indicator comprises a patch fixedly attached to the flexible member.

25. The vehicle of claim 21, wherein:
the overload indicator comprises a substance applied to the flexible member, the substance comprising at least one of dye, ink and paint.

26. The vehicle of claim 21, wherein
the overload indicator comprises a flag positioned between the flexible member and the reinforcement structure;
the flag comprises a first portion fixedly attached to at least one of the flexible member and the reinforcement structure; and
the flag further comprises a second portion that is movable relative to each of the flexible member and the reinforcement structure when a tensile force, which is equal to or greater than a predetermined tensile force, is applied to the flexible member such that the second portion of the flag is visible and indicates that the structural integrity of the net structure has been compromised.

27. The vehicle of claim 26, wherein:
the flag comprises a resilient material.

* * * * *